US012050509B2

(12) United States Patent
Giddings et al.

(10) Patent No.: US 12,050,509 B2
(45) Date of Patent: Jul. 30, 2024

(54) ROOT CAUSE PATTERN RECOGNITION BASED MODEL TRAINING

(71) Applicant: Microsoft Technology Licensing, LLC, Redmond, WA (US)

(72) Inventors: Allison Mae Giddings, Bellevue, WA (US); Mo Zhou, Medina, WA (US); Dong Yuan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 291 days.

(21) Appl. No.: 17/160,214

(22) Filed: Jan. 27, 2021

(65) Prior Publication Data

US 2022/0237063 A1    Jul. 28, 2022

(51) Int. Cl.
*G06F 11/07* (2006.01)
*G06F 11/32* (2006.01)
(Continued)

(52) U.S. Cl.
CPC .......... *G06F 11/079* (2013.01); *G06F 11/321* (2013.01); *G06F 11/3409* (2013.01);
(Continued)

(58) Field of Classification Search
CPC .. G06F 11/079; G06F 11/321; G06F 11/3409; G06F 40/226; G06F 40/242; G06F 40/216; G06F 40/279; G06N 20/00
See application file for complete search history.

(56) References Cited

U.S. PATENT DOCUMENTS

| 7,818,333 | B2 | 10/2010 | Biard et al. |
| 8,868,479 | B2 | 10/2014 | Mitchell et al. |

(Continued)

FOREIGN PATENT DOCUMENTS

| EP | 3591539 A1 | 1/2020 |
| WO | 2017027030 A1 | 2/2017 |

OTHER PUBLICATIONS

Sharma, S., Ratti, R., Arora, I., Solanki, A., & Bhatt, G. (Jan. 2018). Automated parsing of geographical addresses: A multilayer feedforward neural network based approach. In 2018 IEEE 12th International Conference on Semantic Computing (ICSC) (pp. 123-130). IEEE. (Year: 2018).*

(Continued)

*Primary Examiner* — Michelle M Koeth
*Assistant Examiner* — Philip H Lam
(74) *Attorney, Agent, or Firm* — Foley IP Law, PLLC

(57) ABSTRACT

Examples provide a system and method for retraining a machine learning (ML) algorithm associated with a trained model using root cause pattern recognition. The system analyzes the results of parsing unstructured data and identifies a root cause pattern causing the trained model to underperform when parsing data including the identified pattern. Examples of data including the pattern are created for use in retraining the model to correctly detect and parse data following the identified pattern. Once retrained, the model is able to parse unstructured data, including data having the identified pattern, in accordance with expected performance metrics. The system automatically identifies parsing errors, identifies the root cause patterns for these errors and retrains the models to correctly handle those patterns for more accurate and efficient handing of unstructured data by trained models.

20 Claims, 13 Drawing Sheets

(51) Int. Cl.
*G06F 11/34* (2006.01)
*G06F 40/226* (2020.01)
*G06F 40/242* (2020.01)
*G06N 20/00* (2019.01)

(52) U.S. Cl.
CPC .......... *G06F 40/226* (2020.01); *G06F 40/242* (2020.01); *G06N 20/00* (2019.01)

(56) References Cited

U.S. PATENT DOCUMENTS

| | | | |
|---|---|---|---|
| 9,053,416 B1* | 6/2015 | De Leo | G06N 7/01 |
| 9,251,472 B1* | 2/2016 | Linowes | F24F 11/49 |
| 10,366,159 B2 | 7/2019 | Namjoshi et al. | |
| 10,839,156 B1* | 11/2020 | Saxena | H04L 67/52 |
| 2011/0087695 A1 | 4/2011 | Sharma et al. | |
| 2012/0278336 A1* | 11/2012 | Malik | G06F 40/289 |
| | | | 707/748 |
| 2013/0231920 A1* | 9/2013 | Mathew | G06F 16/35 |
| | | | 705/7.29 |
| 2013/0311481 A1* | 11/2013 | Bhatt | G06F 16/31 |
| | | | 707/741 |
| 2016/0147943 A1* | 5/2016 | Ash | G06N 20/00 |
| | | | 705/3 |
| 2017/0286525 A1* | 10/2017 | Li | G06N 20/00 |
| 2018/0039914 A1* | 2/2018 | Menahem | G06Q 10/20 |
| 2018/0113773 A1* | 4/2018 | Krishnan | G06N 20/20 |
| 2018/0359648 A1* | 12/2018 | Savalle | H04W 36/00835 |
| 2019/0319811 A1* | 10/2019 | Mahmoud | G06F 40/205 |
| 2020/0004765 A1* | 1/2020 | Sørensen | G06F 18/214 |
| 2020/0311207 A1 | 10/2020 | Kim et al. | |
| 2020/0372306 A1* | 11/2020 | Nayak | G06K 9/6263 |
| 2020/0387803 A1* | 12/2020 | Kujawinski | G06K 9/6262 |
| 2021/0136098 A1* | 5/2021 | Stergioudis | G06N 20/20 |
| 2021/0303793 A1* | 9/2021 | Wang | G06F 40/232 |
| 2022/0019735 A1* | 1/2022 | Shekhar | G06N 3/08 |

OTHER PUBLICATIONS

Barrentine, Al., "Inside Libpostal—A Fast, Multilingual, International Street Address Parser Trained on Openstreetmap Data", Retrieved from: https://www.mapzen.com/blog/inside-libpostal/, Feb. 24, 2016, 23 Pages.

Yassine, et al., "Leveraging Subword Embeddings for Multinational Address Parsing", In Repository of arXiv:2006.16152v2, Oct. 16, 2020, 8 Pages.

"International Search Report and Written Opinion Issued in PCT Application No. PCT/US21/064501", Mailed Date: Apr. 5, 2022, 10 Pages.

* cited by examiner

Examples of patterns

| Type | Comment | User Examples | Truth Label |
|---|---|---|---|
| Data Characteristic | Postcode without space | ****** ******/road, brighton bighton/suburb, brighton/city, bn17he/state_district, united kingdom/country | ****** ******/road, brighton bighton/suburb, brighton/city, bn17he/postcode, united kingdom/country |
| Data Characteristic | Colorado /CO | ****/house_number, s ******** st ********/road, co 82122/unit, usa/country | ****/house_number, s ******** st/road ********/city, co/state 821222/postcode, usa/country |
| Pattern | Postcode Country CA | log 1mo/city, can/country | log 1mo/postcode, can/country |
| Pattern | Add state UK | ***** ***** ***** *****/road, sheffield/city, yorkshire/country, s20 8gn/postcode, united kingdom/country]] | ***** ***** ***** *****/road, sheffield/city, yorkshire/state, s20 8gn/postcode, united kingdom/country]] |
| Data Market | Puerto Rico | *** ** *** *****/house, # 000/unit, gurabo/house, pr/road, 00778/postcode, usa/country | *** ** *** *****/house, # 000/unit, gurabo/city, pr/state, 00778/postcode, usa/country |
| Data Market | Quebec | 0000-0/house_number, ******** laval qc/road, h7r 0c2/postcode, can/country | 000-0/ house_number, ********/road laval/city qc/state, h7r 0c2/postcode, can/country |

Input: 1302
Address Line 1: 1 Microsoft Way, City: Redmond, State: WA, Postal code: 98052, Country: United States of America Output: 1304
[address line 1 city state postal code] = 1 Microsoft Way Redmond WA 98052
[address line 1 city state] = 1 Microsoft Way Redmond WA
[city state postal code] = Redmond WA 98052
[address line 1 city] = 1 Microsoft way Redmond
[city state] = Redmond WA
[state postal code] = WA 98052
[address line 1] = 1 Microsoft Way
[city] = Redmond
[state] = WA
[postal code] = 98052

FIG. 13

Pattern 11111 – Address line, city, state, postcode, country

| | Overall | Pattern (11111) | Pattern (11111) City | Pattern (11111) State | Pattern (11111) Postcode | Pattern (11111) Country |
|---|---|---|---|---|---|---|
| Model (UK) 1402 | 69.6 | 14.5% | 74.4% | 17.8% | 84.5% | 94.3% |
| Model (UK) 1404 after adding pattern 11111 | 84.1 | 63.5% | 79.9% | 67.1% | 89.0% | 97.8% |

FIG. 14

ROOT CAUSE PATTERN RECOGNITION BASED MODEL TRAINING

BACKGROUND

It is frequently beneficial for unstructured data to be parsed into a structured data format for storage in a database or processing by an application or other software. An algorithm may be used to convert unstructured data into structured data. However, some unstructured data, such as, but not limited to, natural language text, may be provided in a wide variety of difficult-to-predict formats and styles, which can result in inaccuracies and errors in the conversion process. These variations and inconsistencies can result in parsing errors when attempts are made to convert unstructured data into structured data. Moreover, some types of data are more difficult to parse correctly than others. Currently, the task of identifying parsing errors is a manual process which is frequently tedious, inaccurate, unreliable, and inefficient.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some examples provide a computer system for retraining a model using root cause pattern recognition. The computer system includes a data storage device storing unstructured data; at least one processor; and one or more tangible computer-readable media having stored thereon program code for root cause pattern recognition. The program code causes the at least one processor to receive an analysis result from a machine learning (ML) algorithm associated with a trained model. The analysis result includes parsed data indicating the model is underperforming with regard to parsing at least a portion of the unstructured data input into the trained model. A pattern in the portion of the unstructured data associated with a root cause contributing to underperformance of the trained model is identified. The pattern includes an order of components within the portion of the unstructured data and/or a data characteristic of the unstructured data incorrectly parsed by the trained model. One or more examples including the root cause pattern is generated. The ML algorithm is automatically retraining the ML algorithm associated with the trained model using the one or more examples. The ML algorithm is trained to correctly parse input unstructured data including the root cause pattern. When the retrained ML algorithm is able to detect the root cause pattern in the training data, the trained model is redeployed to resume parsing of the unstructured data by the trained model.

Other examples provide a method for root cause pattern recognition. An analysis result is received from a ML algorithm associated with a trained model. The result includes parsed data indicating the model is underperforming with regard to parsing at least a portion of the unstructured data input into the trained model. A pattern is identified which is contributing to underperformance of the trained model. Examples including the root cause pattern are generated. The trained model is retrained using the examples. The retrained model then resumes parsing the unstructured data after retraining enables the model to detect the identified pattern.

Still other examples provide one or more computer storage devices having computer-executable instructions stored thereon for root cause pattern recognition for retraining ML models, which, on execution by a computer, cause the computer to perform operations, including identification of the root cause. An analysis result is received from a ML algorithm associated with a trained model. The analysis result includes parsed data indicating the model is underperforming. The root cause pattern for the underperformance is identified. Examples including the pattern are generated. The model is retrained using the examples. The model is trained to detect the pattern. In response to determining the retrained ML algorithm associated with the trained model is detecting the root cause pattern, parsing of the unstructured data by the trained model resumes.

BRIEF DESCRIPTION OF THE DRAWINGS

FIG. 12 is an exemplary table including example address data set examples.

FIG. 13 is an exemplary table including pattern dictionary data.

FIG. 14 is an exemplary table including metrics data for a trained ML model and the retrained ML model.

Corresponding reference characters indicate corresponding parts throughout the drawings.

DETAILED DESCRIPTION

Figure 1:
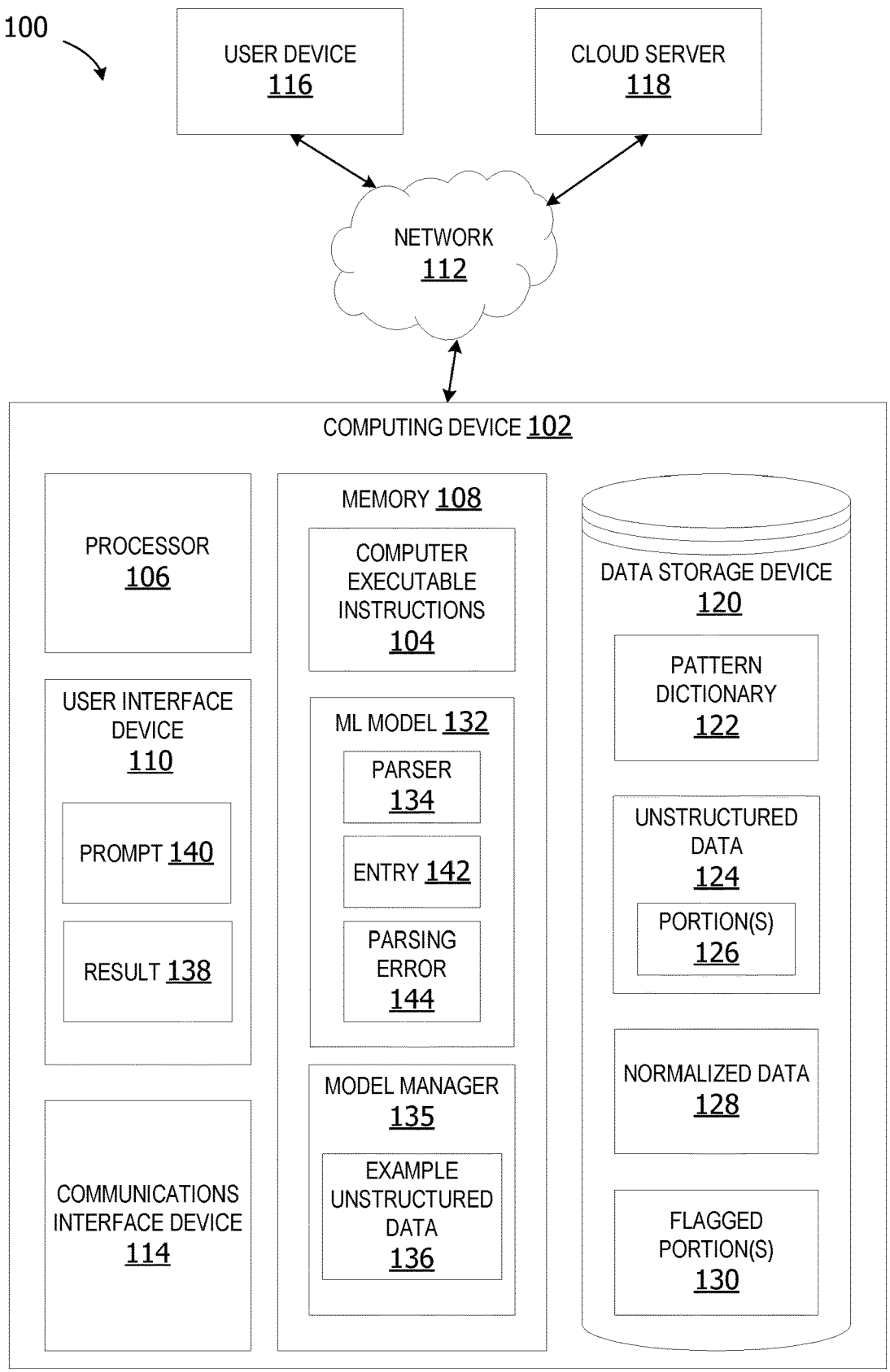
FIG. 1 is an exemplary block diagram illustrating a system for retraining a trained machine learning (ML) model using root cause pattern recognition.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseam.

It is sometimes desirable to convert data in an unstructured format into a more organized format for processing by software or storage in a database. Data parsing is the process of normalizing the unstructured data into a desired structural data format, which may be performed by a normalization model. However, unstructured data may be received by the model in a multitude of different formats and styles, which can result in inaccurate data conversion.

For example, but without limitation, if the unstructured data includes geographical addresses in a natural language format, those addresses may include a wide variety of different abbreviations for different streets, cities, counties, states, etc. Even in cases where users are entering the exact same address, the user-provided address data can have typos, missing components, and components in the wrong order. These variations in the addresses may vary by user.

Unstructured data, such as natural language text provided by users can also be associated with different types of noise. For example, an absence of a value in a data field may be indicated in a variety of ways, such as, but not limited to, the values "0", "n/a," "not available" and/or "null." As another example with unstructured data such as addresses, some place names may belong to a different component depending on the rest of the values in the address—for example, California is a state in the United States, but it is also a city in Kentucky and in Maine. Addresses also change over time, as new places are built, or old places are renamed. Addresses may also have different names in different languages, and different countries have different standard ways of organizing the address components. These complexities can create a challenge for normalization models to accurately convert unstructured data such as address data into structured address data. Moreover, different patterns in the address data may be more difficult to parse correctly than other addresses.

Typically, a user manually reviews the structured data output by a parser to identify problems with the output structured data. The potential problems include parsing errors. For example, if the unstructured data input into the trained model is address data and the structured data output from the model consistently has the state abbreviation "OK" incorrectly placed into a data field for the city name, this is a parsing error. This consistent error may be used to identify a root cause pattern, which may be causing the trained normalization model to generate inaccurate results. However, the complexities of the input unstructured data and/or the output structured data can likewise make it difficult for human users to accurately identify aspects of the data, or root causes, which may be causing the normalization model to parse it incorrectly. For example, looking at one input unstructured data including a residence or other address and/or the output structured data fields holding the various address components may not provide enough information to tell the user which component or other part of the address is forming a pattern that is causing a problem for the trained normalization model, which is why a complex process is needed, in some examples, to identify the pattern and evaluate the results.

Referring to the figures, examples of the disclosure enable retraining a trained machine learning (ML) model using root cause pattern recognition. In some examples, an analysis result is received from a ML algorithm associated with a trained model. The result includes parsed data indicating the model is underperforming with regard to parsing at least a portion of the unstructured data input into the trained model. In these examples, the system is able to analyze performance metrics for the parsed data to automatically identify parsing errors and underperformance by the system with greater speed, efficiency and accuracy than is possible for a human user. Moreover, the system is able to identify errors and root cause patterns contributing to those errors that would be unidentifiable to human users due to the underlying complexity of the data. This enables improved parsing results and reduced analysis time by users.

In some examples, one or more patterns are automatically identified in the parsed data which is contributing to underperformance of the trained model. Examples including the root cause pattern are generated. The trained model is retrained using the examples. The system automatically identifies the root cause patterns and generates example data more quickly and accurately than would be possible for a human analyst. Moreover, the system automatically analyzes the parsing errors and identifies causes with improved speed and accuracy than would otherwise be possible for human users or prior art systems.

In some examples, the model is retrained to detect the identified root cause pattern. The retrained model automatically resumes parsing the unstructured data employing different policies and/or rules for handling the identified root cause pattern, which results in more accurate parsing. This enables automatic identification of root cause patterns and retraining of the model with little or no human intervention. The system is enabled to identify patterns within input unstructured data which would be prohibitively difficult, time-consuming, or impossible for a human user due to the potentially complex and varied patterns within the data which could be causing the parsing errors. In other words, the system is able to identify root cause patterns within unstructured data that analysis beyond human recognition due to the complexity and volume of the data.

Other examples of the disclosure enable an address normalization machine learning (ML) model. In some examples, the system provides an ML model that analyzes a candidate address to identify a root cause pattern associated with a failure of the ML model to correctly parse the unstructured candidate address into a structured address. The automated ML model is able to capture the reason for the root cause better than a manual inspection of the address data. The system captures a broader and more accurate root cause for problems associated with parsing data rather than just a specific cause associated with an isolated address. This improves the efficiency and accuracy of address normalization by the ML model.

Other aspects of the disclosure provide for automated analysis and processing of user (customer) address data for improved privacy and better security for users. The parser algorithm associated with the ML model can be run on top of the customer data to enable improved privacy as human user access to customer data is more limited due to automation within the ML model.

In other examples, the aspects of the disclosure are able to make more accurate judgments with regard to identifying root causes and retraining models than a human user. The metric driven approach of the ML model further enables more accurate quantification of the effects of the root cause using performance metrics and scoring/ranking data. The system identifies the impact of the root cause on user-provided address data. For example, if the root cause only impacts a few addresses, the low impact may indicate retraining the model is unnecessary. For example, if an issue only impacts two or three addresses, it may not be worth expending resources to retrain the model. In contrast, if the impact of the root cause is greater, impacting hundreds or even thousands of addresses, it indicates that retraining the model may be more beneficial to mitigate the impact of the root cause on larger customer data sets. This enables improved quality of ML model output and more effective model training than is possible by a human user.

In still other examples, the system automatically evaluates the impact of root causes to determine whether it is beneficial to retrain the model. This reduces system resource usage, conserves memory, and reduces processor load, without sacrificing efficiency gains obtained when the ML model is retrained for improved accuracy of output.

The computing device operates in an unconventional manner by automatically evaluating the impact of each identified root cause associated with a candidate address, as well as the confidence score of each candidate. The system compares the accuracy and impact levels associated with each address to determine whether or not it is desirable to expend system resources retraining the ML model. In this manner, the computing device is used in an unconventional way, and allows improved address normalization by a dynamically retrainable ML model which continually improves performance via feedback and machine learning while simultaneously applying performance metrics to avoid unnecessary retraining operations, thereby improving the functioning of the underlying computing device.

Furthermore, each time the model is retrained and re-tested, the ML model generates more accurate and reliable results. This reduces the unstructured data normalization error rate and improves efficiency of the computing process by generating more accurate normalized data via the automated testing and training of the ML models.

The trained ML model, in some examples, is an address normalization model that trains on the scale of tens of millions of addresses and covers multiple markets of addresses. A market refers to a geographic area or region. The customer data the model is applied on includes millions of addresses and is refreshed with new data periodically at a user-configured time interval and/or at an occurrence of a predetermined event.

Many of the examples presented below are discussed in the context of parsing unstructured address data into structured data for analysis or storage. However, the examples are not limited to parsing or otherwise processing address data. In other examples, the trained ML model may be used to identify root cause patterns in any type of unstructured data for processing or parsing by the trained ML model. For example, the system may be utilized to process unstructured data such as, but not limited to, natural language text, human speech, optical character recognition, music, videos, images, excerpts from printed publications, data feeds, weather data or any other type of unstructured data.

Referring again to FIG. 1, an exemplary block diagram illustrates a system 100 for retraining a trained machine learning (ML) model using root cause pattern recognition. Unstructured data is data which has not been organized in a pre-defined manner, such as, natural language text, dates, numbers, addresses and other types of user-provided data. In the example of FIG. 1, the computing device 102 represents any device executing computer-executable instructions 104 (e.g., as application programs, operating system functionality, or both) to implement the operations and functionality associated with the computing device 102.

The computing device 102, in some examples, includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102 in other examples includes a user interface device 110.

The processor 106 includes any quantity of processing units and is programmed to execute the computer-executable instructions 104. The computer-executable instructions 104 is performed by the processor 106, performed by multiple processors within the computing device 102 or performed by a processor external to the computing device 102. In some examples, the processor 106 is programmed to execute instructions such as those illustrated in the figures (e.g., FIG. 6, FIG. 7, FIG. 8, FIG. 9, FIG. 10, and FIG. 11).

The computing device 102 further has one or more computer-readable media such as the memory 108. The memory 108 includes any quantity of media associated with or accessible by the computing device 102. The memory 108, in these examples is internal to the computing device 102 (as shown in FIG. 1). In other examples, the memory 108 is external to the computing device (not shown) or both (not shown).

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other examples, the user interface device 110 includes a graphics card for displaying data to the user and receiving data from the user. The user interface device 110 can also include computer-executable instructions (e.g., a driver) for operating the graphics card. Further, the user interface device 110 can include a display (e.g., a touch screen display or natural user interface) and/or computer-executable instructions (e.g., a driver) for operating the display. The user interface device 110 can also include one or more of the following to provide data to the user or receive data from the following: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 102 in one or more ways.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface device 114. The communications interface device 114 includes a network interface card and/or computer-executable instructions (e.g., a driver) for operating the network interface card. Communication between the computing device 102 and other devices, such as but not limited to a user device 116 and/or a cloud server 118, can occur using any protocol or mechanism over any wired or wireless connection. In some examples, the communications interface device 114 is operable with short range communication technologies such as by using near-field communication (NFC) tags.

The user device 116 represent any device executing computer-executable instructions. The user device 116 can be implemented as a mobile computing device, such as, but not limited to, a wearable computing device, a mobile telephone, laptop, tablet, computing pad, netbook, gaming device, and/or any other portable device. The user device 116 includes at least one processor and a memory. The user device 116 can also include a user interface device.

The cloud server 118 is a logical server providing services to the computing device 102 or other clients, such as, but not limited to, the user device 116. The cloud server 118 is hosted and/or delivered via the network 112. In some non-limiting examples, the cloud server 118 is associated with one or more physical servers in one or more data centers. In other examples, the cloud server 118 is associated with a distributed network of servers.

The system 100 can optionally include a data storage device 120 for storing data, such as, but not limited to a pattern dictionary 122, 'unstructured data 124 representing one or more discrete portion(s) 126 of the unstructured data, normalized data 128 and/or one or more flagged portion(s) 130.

The pattern dictionary 122 is a dictionary storing pattern data associated with one or more types of unstructured data. The pattern data may be associated with various types of data and portion of data, such as, but not limited to, an address component field values for one or more geographical addresses, a word or phrase within a natural language sentence or speech excerpt, a section of an image, etc.

The flagged portion(s) 130 is a set of one or more data portions or individual entries in the unstructured data which were flagged as incorrectly parsed. In other words, a flagged portion 130 of the data is a discrete portion, entry, or segment of the data which the trained ML model 132 attempted to parse using parser 134 with results which were below a minimum performance quality expectation for the system.

The ML model 132 is a trained model including a ML algorithm for processing data, such as, but not limited to, parsing unstructured data. The ML model 132 can be trained using training data to learn how to process data more efficiently or accurately by employing pattern recognition and other artificial intelligence algorithms. The ML model 132 may be referred to as a trained model, a trained ML model, a retrained ML model and/or a retrained model.

Parser 134 is a software component for parsing unstructured address data into structured address data. The parser 134 in this non-limiting examples parses or attempts to parse unstructured data into normalized data 128. In this example, the results of parsing the flagged portion(s) 130 of the unstructured data resulted in one or more errors or inaccuracies in the normalized data generated by the parser 134.

The data storage device 120 can include one or more different types of data storage devices, such as, for example, one or more rotating disks drives, one or more solid state drives (SSDs), and/or any other type of data storage device. The data storage device 120, in some non-limiting examples, includes a redundant array of independent disks (RAID) array. In other examples, the data storage device 120 includes a database, such as, but not limited to, the database 246 in FIG. 2 below.

The data storage device 120, in this example, is included within the computing device 102, attached to the computing device, plugged into the computing device, or otherwise associated with the computing device 102. In other examples, the data storage device 120 includes a remote data storage accessed by the computing device via the network 112, such as a remote data storage device, a data storage in a remote data center, or a cloud storage.

In some examples, a ML model 132 parses the unstructured data 124 to create normalized data 128. Parsing refers to converting received data into a different format, such as converting human text into structured format suitable for processing or storage in a data storage device. If one or more of the portions of the input unstructured data are inaccurately parsed, the output structured data portion(s) which were incorrectly parsed are flagged. For example, if the input unstructured data include a plurality of natural text format addresses for various markets, any addresses which are incorrectly parsed are flagged. The flagged addresses are the addresses which resulted in underperformance of the ML model 132.

The flagged portion(s) 130 of the data may be automatically flagged by the ML model 132 itself. In other examples, a user reviewing the normalized data 128 can manually flag the data where the user has access to some structured data to compare to the model's output. In other words, if the user has some structured data, the user can compare that structured data examples to the normalized data output by the ML model to determine whether to flag any portion(s) of the data. The user submits the flagged portion(s) 130 to the ML model 132.

In other examples, the ML model 132 automatically identifies incorrectly parsed data based on a confidence score. The confidence score is a score indicating the accuracy or confidence level of the system for each parsed portion of the normalized data. If the confidence score for a given portion of the parsed data is low and falls below a minimum confidence threshold, the identified portion of the parsed data is automatically flagged by the system.

Likewise, where the system is attempting to identify a root cause pattern in example data sets, if a pattern within the data which is being investigated as a possible cause for the overall underperformance has a low confidence score associated with that portion of the data, it is unlikely that portion of the data is responsible for the underperformance. Therefore, the low confidence score cause is discarded as the root cause. If a pattern in a portion of the data which is being parsed by the system has a very high confidence score associated with the potential cause, indicating high confidence the potential cause contributed to the inaccuracy of the parsing results, the possible cause is likely to be the actual root cause for the underperformance.

The ML model 132 analyzes the flagged portion(s) 130 to identify one or more potential root causes for the parsing problems associated with the flagged portion(s) of the data. The root cause identifies a pattern or other issue within the unstructured data that is causing the ML model 132 to incorrectly parse the data. The pattern can include the order of components of the data or a characteristic of the data. A component of the data refers to the parts of the data. For example, if the unstructured data is an address, one component of the address is the city and another component of the address is the state. If the data is an audio file, one component of the data may be volume while another component of the data may be amplitude or background noise level, etc.

A model manager 135 is a software component for evaluating the ML model 132 and/or retraining the ML model 132. The model manager 135 creates example unstructured data 136 that includes one or more root cause patterns associated with the flagged portion(s) 130. The ML model 132 includes at least a portion of unstructured data 124 conforming to the same pattern as the identified root cause. The model manager 135 automatically retrains the ML model 132 using the set of example unstructured data 136. The trained model is re-trained to parse unstructured data having the pattern associated with the root cause in a different manner to automatically reduce parsing errors. Reducing parsing errors refers to creation of fewer errors during parsing and/or elimination of a specific parsing error which had occurred prior to retraining the ML model.

The example unstructured data 136 in some examples includes a set of test data used for evaluating the ML model 132. The example unstructured data 136 may be generated using data obtained from the pattern dictionary 122.

In other examples, the example unstructured data 136 is generated using the unstructured data 124 obtained from the user. The model, in some non-limiting examples, can be trained with user data. However, the model is not trained with the user data.

The model manager 135, in some examples, presents a result 138 of the ML model evaluation performed using the example unstructured data 136 via the user interface device 110. In some non-limiting examples, the result 138 is an analysis result generated by a ML algorithm associated with the trained ML model. The analysis result includes parsed data indicating the model is underperforming with regard to parsing at least a portion of the unstructured data input into the trained model. In other words, the unstructured data is parsed to generate the analysis results. The results are analyzed for performance indictors (metrics) which indicate whether the parsing is being performed as expected or whether there are errors (underperforming) due to inability of the model to recognize or correctly handle one or more patterns in the data.

The result 138 in other examples includes performance metrics, confidence score(s), impact score(s) or other performance related data associated with the ML model 132. The ML model 132 automatically parses address data in these examples. The performance metrics, confidence scores and/or impact scores are utilized to identify portion of data associated with underperformance of the trained ML model.

In some examples, retrain criterion for determining if/when to retrain the model is decided based on performance metrics. If the performance metrics fall below a minimum expected precision (minimum threshold precision level) for target impacted portions of the data, the ML model manager 135 automatically begins testing and/or re-training the ML model to improve parsing of the flagged portions of data. The model can optionally be tested and/or retrained until the performance metric data reaches or exceeds the minimum expected precision thresholds. However, in other examples, the ML model does not automatically re-train the ML model 132 unless the user authorizes the re-training.

The model manager 135, in some examples, outputs a prompt 140 to the user via the user interface device 110. The prompt 140 requests a user-selection to accept re-training of the ML model 132 or reject re-training of the ML model 132. If the user rejects the re-training, the ML model 132 is not retrained. Instead, the system 100 continues parsing the data via the ML model 132 without additional retraining based on the identified root cause pattern.

In still other examples, the model manager 135 outputs to the user the result 138 of an evaluation of the re-trained ML model via the user interface device 110. The re-trained ML model is re-trained and evaluated using example unstructured data 136 having pattern(s) corresponding to the root cause pattern of the flagged portion(s) 130.

In some examples, the model manager 135 automatically deploys the re-trained model to parse data after retraining and re-testing of the ML model is completed. In other examples, the re-trained and re-tested ML model is not deployed unless a user authorizes the deployment. In these examples, a prompt is output to the user via the user interface device 110. The prompt requests the user to provide input indicating the user accepts the re-trained ML model for deployment or decline/reject the re-trained ML model. If the user accepts or authorizes the deployment of the re-trained ML model, the re-trained ML model replaces the original trained ML model.

In other examples, the system 100 provides a method for identifying patterns that a ML trained algorithm is not training accurately. The system 100 automatically generates a plurality of unstructured data examples that satisfy those identified root cause patterns. In other words, the system creates data examples in which at least a portion of the data is set forth according to the root cause pattern. The ML model is retrained to learn how to handle those root cause patterns using the example data sets.

In other examples, the system receives a small set (a single address or a few addresses) of user-provided unstructured address examples that were parsed by the ML model incorrectly. The system identifies the root cause/pattern that is causing the example(s) to be parsed incorrectly, where the pattern or root cause may include the ordering of the components, the data characteristics or values, or the market of the examples. The system generates additional training and testing data with this pattern and finds similar customer data examples. The system 100 evaluates the ML model on this additional new data. The system 100 allows the user to decide whether to train the ML model to improve the result accuracy when the ML model parses data having this pattern/root cause.

In some examples, the system samples an appropriate amount of unstructured data with the new pattern and retrains the ML model using the sampled (example) data. The system generates and shares performance metrics for the ML model performance on the overall dataset as well as the new segment for the identified pattern. This allows the user to choose to accept/reject the new model.

In this example, the model manager is shown as a separate software component from the ML model. In other non-limiting examples, the ML model and the model manager are implemented as a single component.

In an example scenario, the trained ML model is an address normalization model. The example unstructured data 136 includes geographical address sample data in which the address data follows a root cause pattern identified by the system. The example data sets are utilized for retraining the ML model 132 for more accurately parsing unstructured data including geographical addresses input in a natural language format.

In still other examples, the ML model receives at least one incorrectly parsed geographical address. The address 142 may be obtained from a user or identified based on a confidence score. The ML model identifies a root cause of a parsing error 144 identified within unstructured address data associated with at least one incorrectly parsed portion of a data entry data 142. In this example, the incorrectly parsed data portion is a geographical address entry. Although the data in this example is an incorrectly parsed geographical address, the examples are not limited to a geographical address. In other examples, the incorrectly parsed data portion included in the entry 142 can include a text description, a question in text, etc.

In the above example scenario, the root cause includes a pattern in the address data. The system generates a set of example address data including unstructured address data associated with a set of example geographical addresses including the pattern corresponding to the identified root cause. The system automatically re-trains the model using the generated set of example address data to correctly parse the at least one geographical address having the pattern associated with the identified root cause. The correctly parsed address is not associated with a parsing error.

Figure 2:
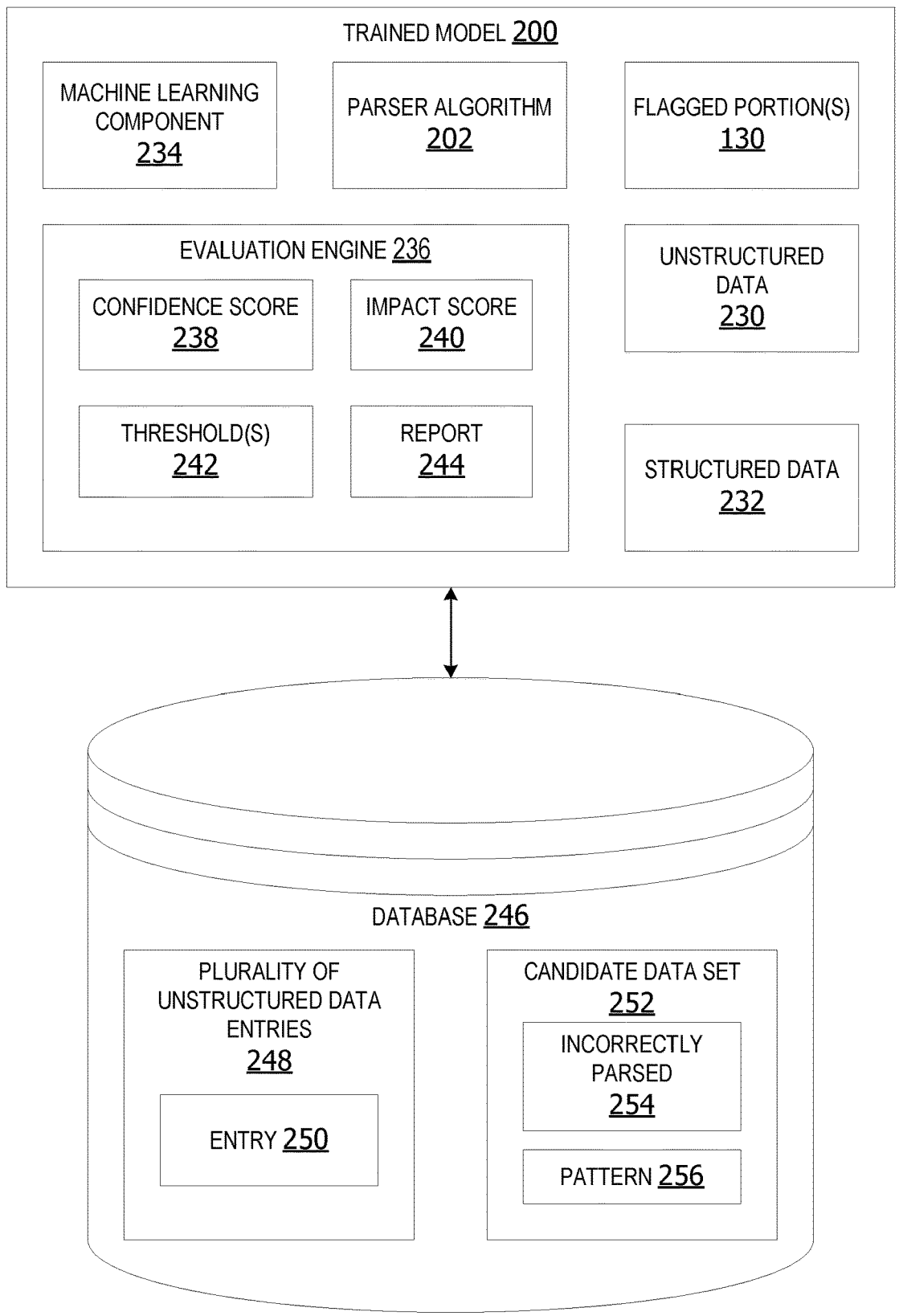
FIG. 2 is an exemplary block diagram illustrating a trained model for normalizing unstructured data.

FIG. 2 is an exemplary block diagram illustrating a trained model 200 for normalizing unstructured data trained model 200. The trained model 200 is a ML model for parsing unstructured data, such as, but not limited to, the ML model 132 in FIG. 1. The trained model 200 includes a parser algorithm 202 for parsing unstructured data 230 into structured data 232.

The unstructured data 230 is any type of unstructured data, such as, but not limited to, natural language audio data, natural language text, image data, etc. The unstructured data 230 can include address data, descriptive data, product information, user feedback, catalog descriptions, excerpts from a publication, spoken instructions or questions, or any other type of information.

The structured data 232 is the unstructured data processed, parsed, or otherwise formatted in accordance with a format or data structure for storage in a data store and/or processing by an application, another ML model or other software. The structured data 232 can include, for example, but without limitation, structured address data. Structured address data is natural language address data which has been parsed into a data structure suitable for storage or processing.

The algorithm 202 is a ML algorithm associated with a trained ML model, such as, but not limited to, the ML model 132 in FIG. 1. The algorithm 202 can be trained using training data to improve the performance and/or accuracy of the algorithm 202, such as, but not limited to, recognition of root cause patterns in unstructured data and how to correctly handle those patterns.

If the flagged portions(s) 130 are received from a user or identified by the trained model 200, the machine learning component 234 analyzes the flagged portion(s) 130 using pattern recognition data to identify one or more probable root causes of the parsing error.

An evaluation engine 236 is a software component that analyzes the structed data output by the trained model 200. The evaluation engine 236 analyzes the output using one or more performance metrics. The evaluation engine 236 generates a confidence score 238 indicating a level of confidence in the generated structured data 232 for unstructured data processed by the trained model 200. In some non-limiting examples, if the confidence score for a given portion of the data indicates a level of confidence that is lower than a confidence threshold in the one or more threshold(s) 242, the trained model 200 flags the given portion of the data. However, in other examples, a portion of the output data is only flagged by user(s).

The evaluation engine 236, in other examples, analyzes the unstructured data in a set of user-provided data and generates an impact score 240 indicating the scope of the identified root cause within the set of user-provided data. If the root cause pattern 256 is only present in a small number of data entries or a low percentage of the entries or other portions of the data, the problems caused by the root cause pattern 256 have less impact than if the pattern is present in a larger number of entries or higher percentage of the entries (data portions).

In some examples, if the impact score 240 is below a threshold value, the system does not continue with the process of retraining the trained model 200. If the impact score 240 is equal to or greater than a threshold, the system proceeds with testing and evaluating the model for retraining.

In still other examples, if the impact score 240 is greater than or equal to a threshold value, the model manager triggers a prompt display on a user interface device requesting user approval to continue with retraining the trained model 200. The re-training updates the model to improve parsing data having the root cause pattern. However, if the impact score 240 is less than the threshold value, the model manager does not prompt the user to choose whether to retrain the ML model.

The database 246, in some examples, stores data, such as, but not limited to, a plurality of unstructured data 248. An entry 250 is a user-provided data entry in an unstructured format, such as, but not limited to, a geographic address. A candidate data set 252 is a set of incorrectly parsed 254 data having a root cause pattern 256 identified by the trained model 200.

In other examples, the system outputs a report 244 to the user via a user interface device. The report 244 can optionally include the performance metrics, scores, recommendations, parsed data results, or any other suitable data.

Thus, the ML model, in an example scenario, is an address normalization model that goes through a process of finding example addresses that the ML model did not solve correctly. The system finds the root cause for why the candidate address was not parsed correctly. The system uses that information to update the ML model so it can solve addresses having that same patter correctly or more accurately in the future. This process automates the parsing, testing, and retraining of the ML address normalization model to reduce or eliminate time and effort required by a user during the process. In this manner, the user can enter address data as input into the trained ML model and receive correct parsed data output from the ML model.

Figure 3:
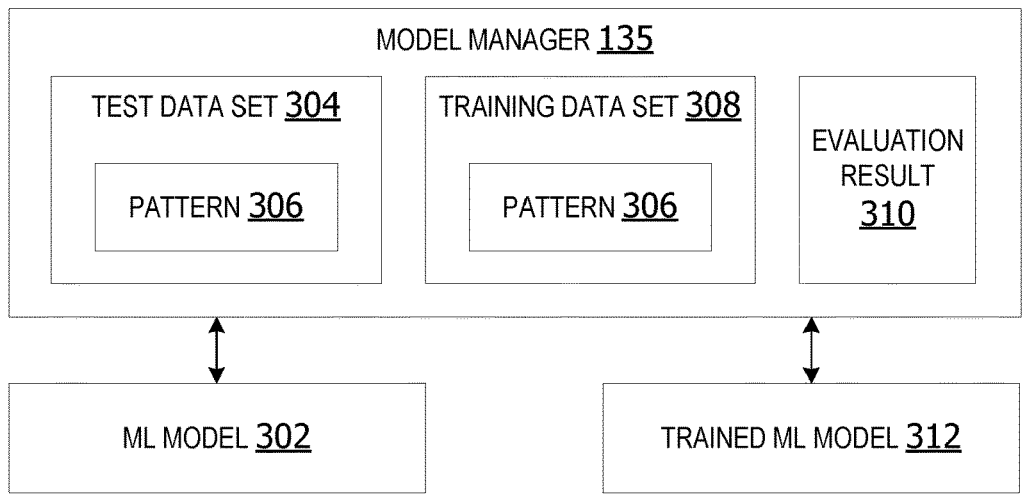
FIG. 3 is an exemplary block diagram illustrating a model manager for testing and training ML models.

FIG. 3 is an exemplary block diagram illustrating a model manager 135 for testing and training ML models. In some non-limiting examples, an ML model 302 parses unstructured data to create structured data. The ML model 302 is a trained ML model, such as, but not limited to, the ML model 132 in FIG. 1 and/or the trained model 200 in FIG. 2. In some examples, if one or more of the portions of the data are flagged due to problems with the parsing, the ML model 302 analyzes the flagged data to identify the root cause pattern present in the flagged data.

In some examples, if the impact of the root cause pattern is sufficient (exceeds a threshold), the model manager 135 generates a test data set 304 of example data having the same pattern as the identified root cause associated with the flagged data portions. The ML model 302 runs the test data set 304 and generates a result.

The model manager 135, in these non-limiting examples, analyzes the result to generate an evaluation result 310. The evaluation result 310 indicates the accuracy of the ML model 302 parsing the test data set 304. If the accuracy or confidence level is below a threshold and/or if the user chooses to re-train the model based on the evaluation result 310, the model manager 135 retrains the model using a training data set 308. The data in the training data set 308 includes data portions conforming to the same pattern 306. A data portion can include, for example but without limitation, a geographical address, a name, a job title, a job description, a product description, or any other type of unstructured data.

In other non-limiting examples, the ML model 302 is re-trained to create a trained ML model 312. The trained ML model 312 is a re-trained ML model which has been trained based on root cause pattern data. The trained ML model 312 is trained to parse data, such as address data, having the same pattern 306 more accurately and efficiently than the ML model 302 which has not been trained or retrained using the root cause pattern example data.

Figure 4:
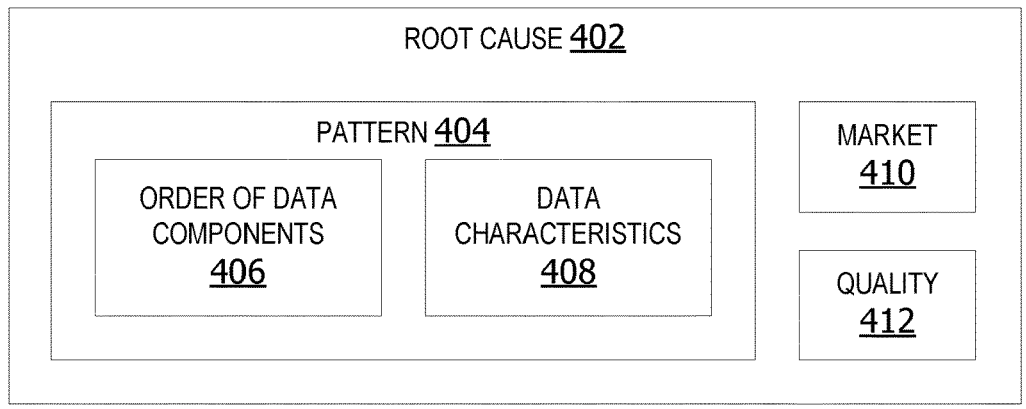
FIG. 4 is an exemplary block diagram illustrating a root cause associated with incorrectly parsed data.

FIG. 4 is an exemplary block diagram illustrating a root cause 402 associated with incorrectly parsed data. The root cause 402 is a predicted cause of the ML model's inability to correctly parse the flagged data. The root cause 402 identifies a pattern 404 within the flagged data. The pattern 404 can include an order of data components 406. Data components are the parts, categories, fields, attributes, or other components of the data. If the unstructured data is an address, the address data components include components such as, but not limited to, the house number, city, state, country, etc. The pattern 404 can also include data characteristics 408. The data characteristics identify data values in one or more fields within the data. If the data is an address, a data characteristic for the state field where the entry is the state of Texas, can include data characteristics such as, but not limited to, "Texas", "TX," Tx," "Tex.", or other variations for the state field of the address. Other root causes of an incorrectly parsed address can include the market 410 (region) of the address and/or the quality 412 of the address data.

Figure 5:
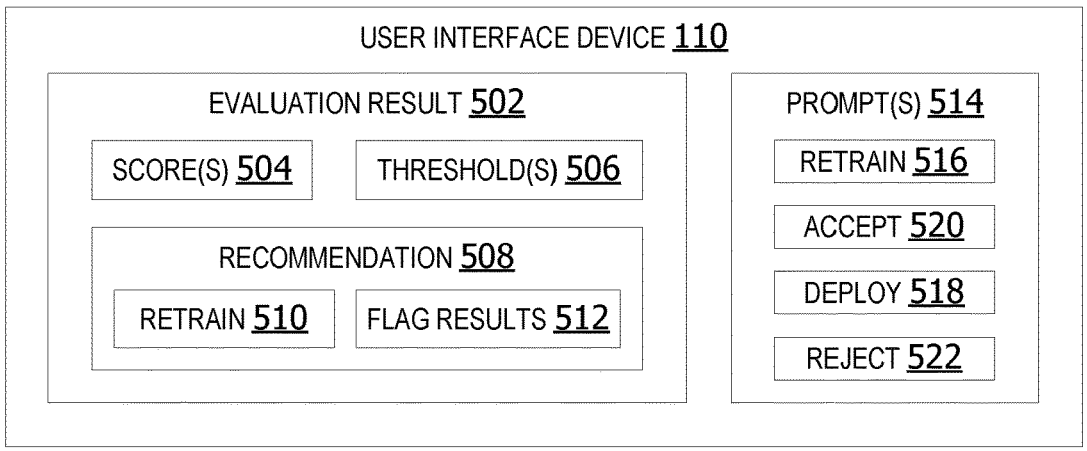
FIG. 5 is an exemplary block diagram illustrating a user interface device for displaying ML model evaluation results and prompts to a user.

FIG. 5 is an exemplary block diagram illustrating a user interface device 110 for displaying ML model evaluation results and prompts to a user. In this example, an evaluation result 502 can include evaluation score(s) 504, such as, but not limited to, a confidence score and/or an impact score. The score(s) 504 can be compared to one or more threshold(s) 506 to determine whether to retrain 510 the ML model based on the performance score(s) 504.

A confidence score can include a parsing confidence score indicating a level of confidence that a parse result is accurate. In such cases, a low confidence score indicates a low level of confidence that a particular portion of unstructured data, such as, but not limited to, an address, was parsed correctly into structured data. Thus, a low score would indicate a high level of likelihood that the parsing result is inaccurate or incorrectly parsed. A high confidence score indicates a high level of confidence that the parsed portion of the data was parsed correctly.

A confidence score can also include a potential root cause confidence score. A root cause confidence score indicates a level of confidence that a potential root cause pattern in a portion of unstructured data which was incorrectly parsed is the cause or contributor to the failure to correctly parse the data. Thus, a high root cause confidence score indicates a high likelihood that a potential root cause pattern in the data is the actual cause of the parsing problems. A low confidence score indicates the potential root cause is probably not the reason a particular portion of data is being incorrectly or inaccurately parsed.

The evaluation result 502 presented to a user can also optionally include a recommendation 508. The recommendation 508 can include a recommendation to re-train the ML model or a recommendation to flag the results 512 of parsing data that conform to the root cause pattern where the ML model is not retrained.

In still other examples, one or more prompt(s) 514 are presented to the user via the user interface device 110. The prompt(s), 514 in some examples, includes a prompt requesting a user accept 520 or reject 522 a recommendation to retrain 516 the ML model. The prompt(s) 514, in other examples, include a request for a user to accept 520 or reject 522 a recommendation to deploy a successfully retrained ML model. The accept 520 is a user approval of retraining.

In an example, the system obtains a small test set of data from a user, including examples of unstructured data that were parsed incorrectly. The system identifies the root cause/pattern that is causing the example to be parsed incorrectly. Some examples of pattern or root cause include the ordering of the components, the data characteristics or values, or the market of the examples. The system generates additional training and testing data with this pattern and finds similar customer examples. The model manager evaluates the model on this additional new data, and the user decides if the ML model should be re-trained to improve this pattern/root cause. If so, the system automatically samples an appropriate amount of data with the new pattern and trains the model using that sample data. The system shares the metrics on the overall dataset with the user via a user interface, as well as the new segment for the identified pattern. The user then chooses to accept the new model or not.

By identifying the pattern of the root cause of the data being parsed incorrectly, the system is able to build a model that is more accurate for unstructured data having this same pattern. Rather than just improving the model for the examples shown, by just adding those examples the system has received in the ML model, the system solves the problem systematically. The system creates new data to train the model which shares the automatically identified root cause pattern. In this way, the model can perform well even on data it has not seen yet that share the same pattern (order, data characteristic, market), rather than just doing well on the given examples. This provides the normalization service better accuracy and enables generation of custom ML models for the normalization service based on the patterns identified in the customer data.

Figure 6:
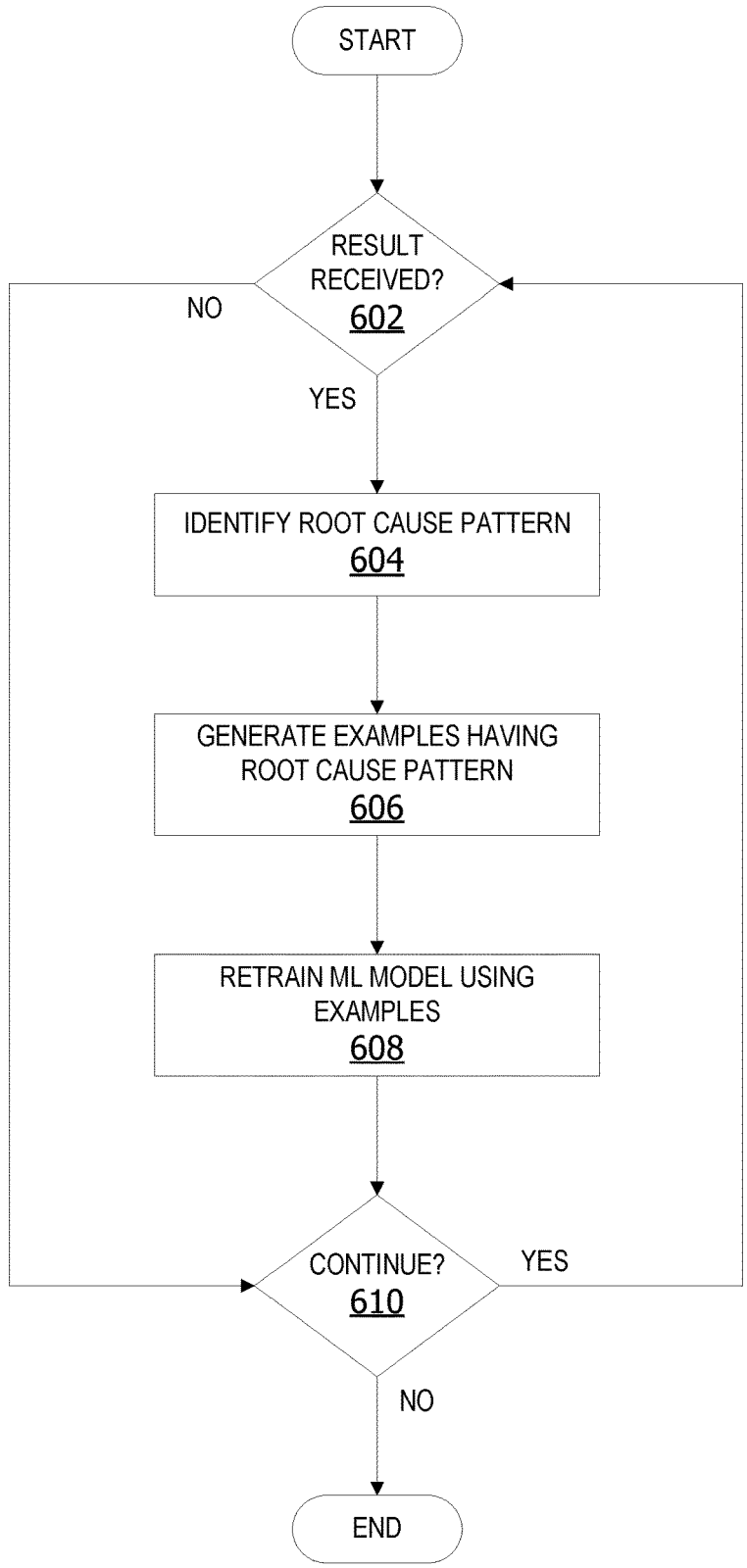
FIG. 6 is an exemplary flow chart illustrating operation of the computing device to retrain an ML model to improve parsing of data.

FIG. 6 is an exemplary flow chart illustrating operation of the computing device to retrain an ML model to improve parsing of data. The process shown in FIG. 6 is performed by a model manager component and/or a ML model, executing on a computing device, such as the computing device 102 or the user device 116 in FIG. 1.

The process begins by determining if analysis results indicating underperformance of the trained model is received at 602. The underperformance is due to one or more patterns which the ML algorithm of the trained model is failing to accurately handle. If yes, the root cause pattern associated with causing the underperformance is identified at 604. The root cause pattern is a pattern in the data which the trained model is not handling correctly or accurately. Examples having the same root cause is generated at 606. The ML algorithm of the trained model is retrained using the examples at 608. A determination is made whether to continue at 610. If yes, the operations at 602 through 610 are iteratively executed until a decision is made not to continue at 610. The process terminates thereafter.

While the operations illustrated in FIG. 6 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 6.

Figure 7:
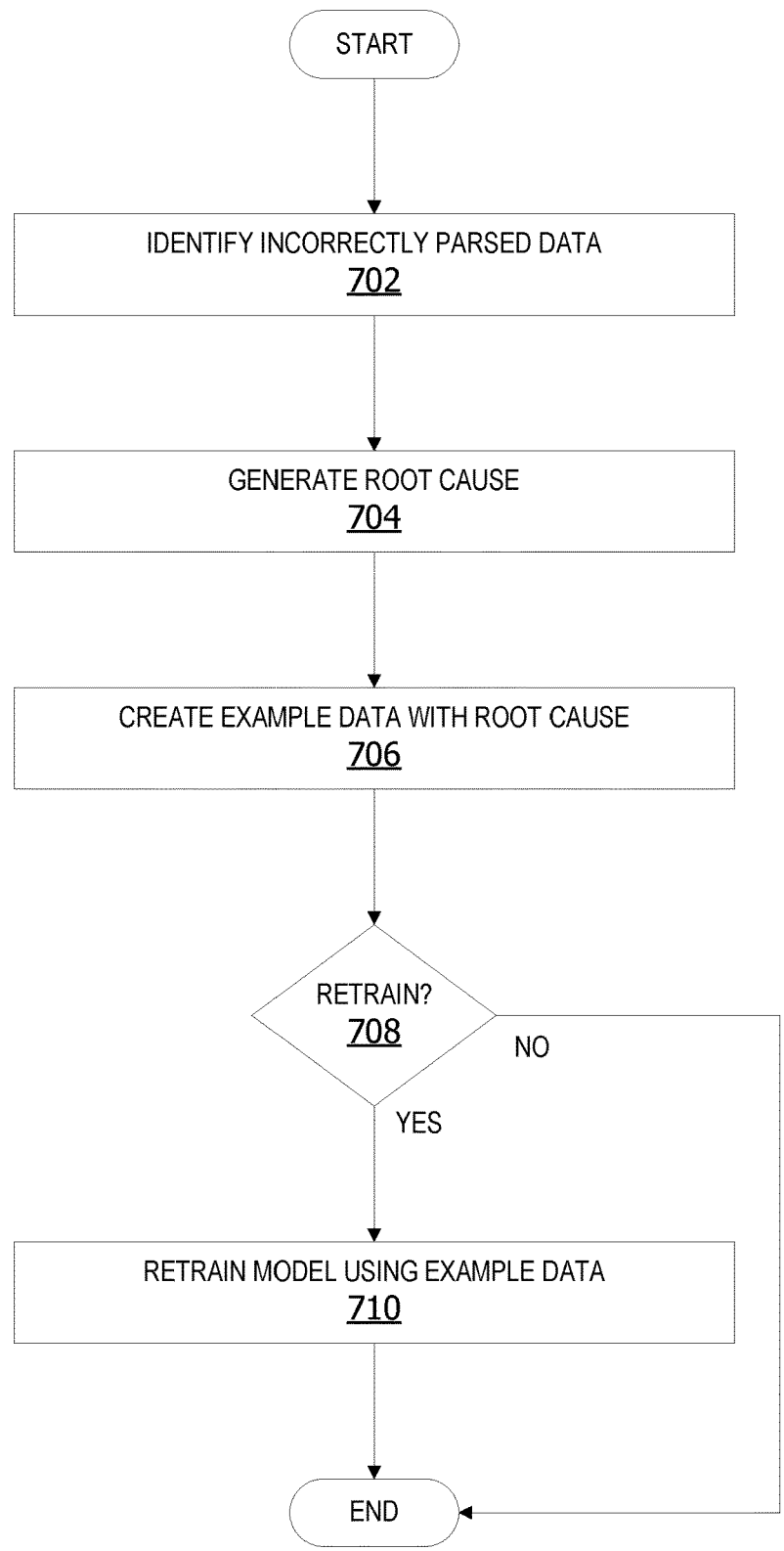
FIG. 7 is an exemplary flow chart illustrating operation of the computing device to retrain ML models based on a root cause for incorrectly parsed data.

FIG. 7 is an exemplary flow chart illustrating operation of the computing device to retrain ML models based on a root cause for incorrectly parsed data. The process shown in FIG. 7 is performed by a model manager component and/or a ML model, executing on a computing device, such as the computing device 102 or the user device 116 in FIG. 1.

An incorrectly parsed portion of data is identified at 702. The incorrectly parsed data can be identified automatically based on a confidence score. The incorrectly parsed data can also be identified based on a flag added to the portions of the data. A root cause for the incorrectly parsed data portions is generated by the ML model at 704. The model manager creates example unstructured data with the same root cause at 706. A determination is made whether to retrain the ML model at 708. The determination can be made based on a user input indicating the user chooses to retrain the model. The determination can also be made based on an impact score and/or a confidence score. If a decision is made to retrain, the model manager retrains the ML model using the created example data having the same root cause as the identified incorrectly parsed data at 710. The process terminates thereafter.

While the operations illustrated in FIG. 7 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 7.

Figure 8:
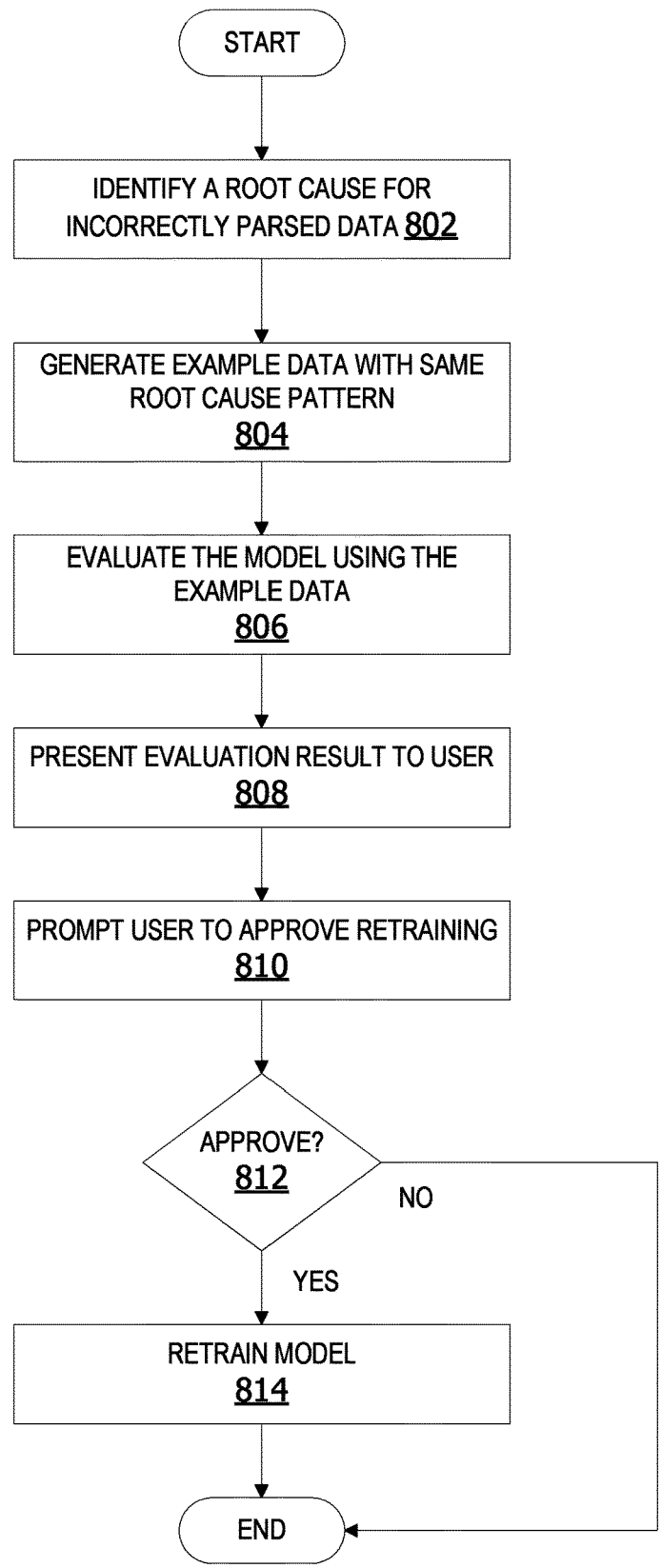
FIG. 8 is an exemplary flow chart illustrating operation of the computing device to retrain a ML model in response to user approval for retraining.

FIG. 8 is an exemplary flow chart illustrating operation of the computing device to retrain a ML model in response to user approval for retraining. The process shown in FIG. 8 is performed by a model manager component and/or a ML model, executing on a computing device, such as the computing device 102 or the user device 116 in FIG. 1.

The process begins by identifying a root cause associated with an incorrectly parsed portion of data 802. The root cause is identified based on a ML model analysis of the data. The model manager generates example data with the same root cause pattern at 804. The ML model is evaluated using the generated example data at 806. The evaluation results generated using the example data is presented to the user via a user interface device at 808. The user is prompted to approve retraining the ML model at 810. A determination is made whether to approve retraining at 812 based on the user input. If yes, the model is retrained at 814. The model is retrained at 814. The process terminates thereafter.

While the operations illustrated in FIG. 8 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 8.

Figure 9:
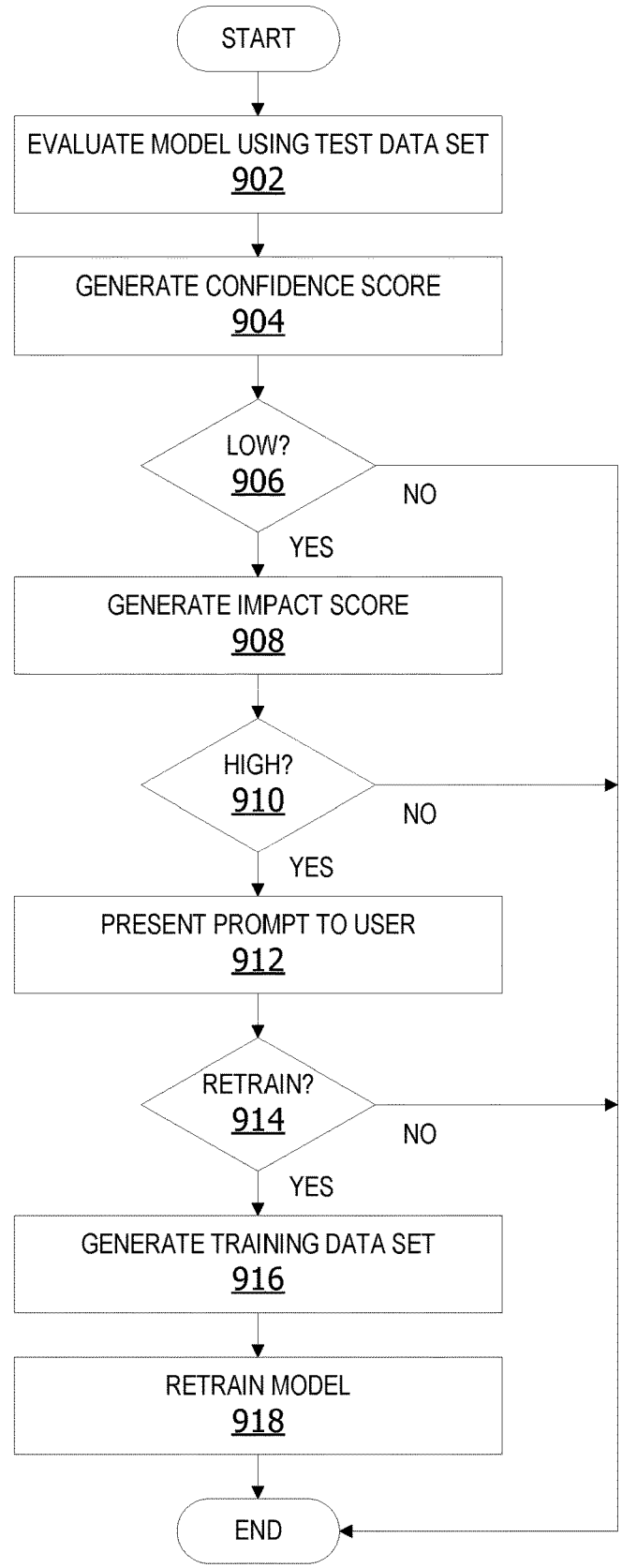
FIG. 9 is an exemplary flow chart illustrating operation of the computing device to retrain a ML model using training data set including example addresses including a pattern similar to the root cause pattern of incorrectly parsed data.

FIG. 9 is an exemplary flow chart illustrating operation of the computing device to retrain a ML model using training data set including example including a pattern similar to the root cause pattern of incorrectly parsed data. The process shown in FIG. 9 is performed by a model manager component and/or a ML model, executing on a computing device, such as the computing device 102 or the user device 116 in FIG. 1.

The process begins by evaluating the ML model using test data set at 902. Generate a confidence score at 904. The confidence score indicates the level of confidence assigned to the structured data generated by the ML model. A determination is made whether the confidence score is low at 906. The score is low if it is less than a threshold. If yes, an impact score is generated at 908. A determination is made whether the impact score is high at 910. The score is high if it is equal to or greater than a threshold. If yes, a prompt is presented to the user at 912. The prompt, in some examples, requests the user to choose to accept or reject retraining the ML model. A determination is made whether the user chooses to retrain the model at 914. If yes, a training data set is generated at 916. The model is retrained using the training data set at 918. The process terminates thereafter.

While the operations illustrated in FIG. 9 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 9.

Figure 10:
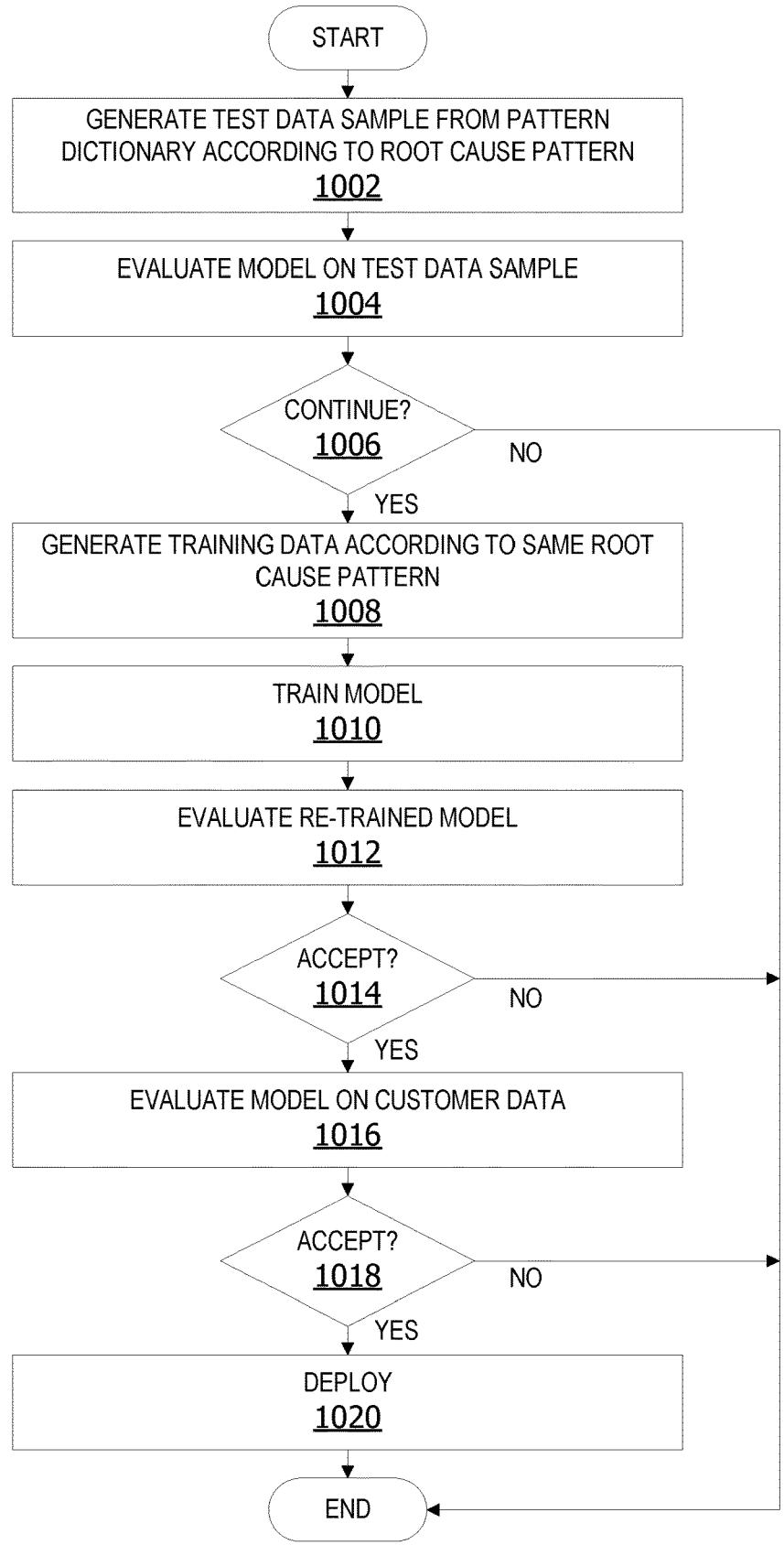
FIG. 10 is an exemplary flow chart illustrating operation of the computing device to test and train a ML model using example data having the same root cause pattern as a candidate portion of data.

FIG. 10 is an exemplary flow chart illustrating operation of the computing device to test and train a ML model using example data having the same root cause pattern as a candidate portion of data. The process shown in FIG. 10 is performed by a model manager component and/or a ML model, executing on a computing device, such as the computing device 102 or the user device 116 in FIG. 1.

The process begins by generating test data sample from a pattern dictionary according to a root cause pattern at 1002. The ML model is evaluated using test data sample at 1004. A determination is made whether to continue at 1006. If yes, the training data is generated according to the same root cause pattern at 1008. The ML model is trained at 1010. The re-trained model is evaluated at 1012. A determination is made whether to accept the re-trained model at 1014. If yes, the ML model is evaluated on customer data at 1016. The customer data is unstructured data provided by a customer for parsing. A determination is made whether to accept the retrained model at 1018. If yes, the re-trained model is deployed at 1020. The process terminates thereafter.

While the operations illustrated in FIG. 10 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 10.

Figure 11:
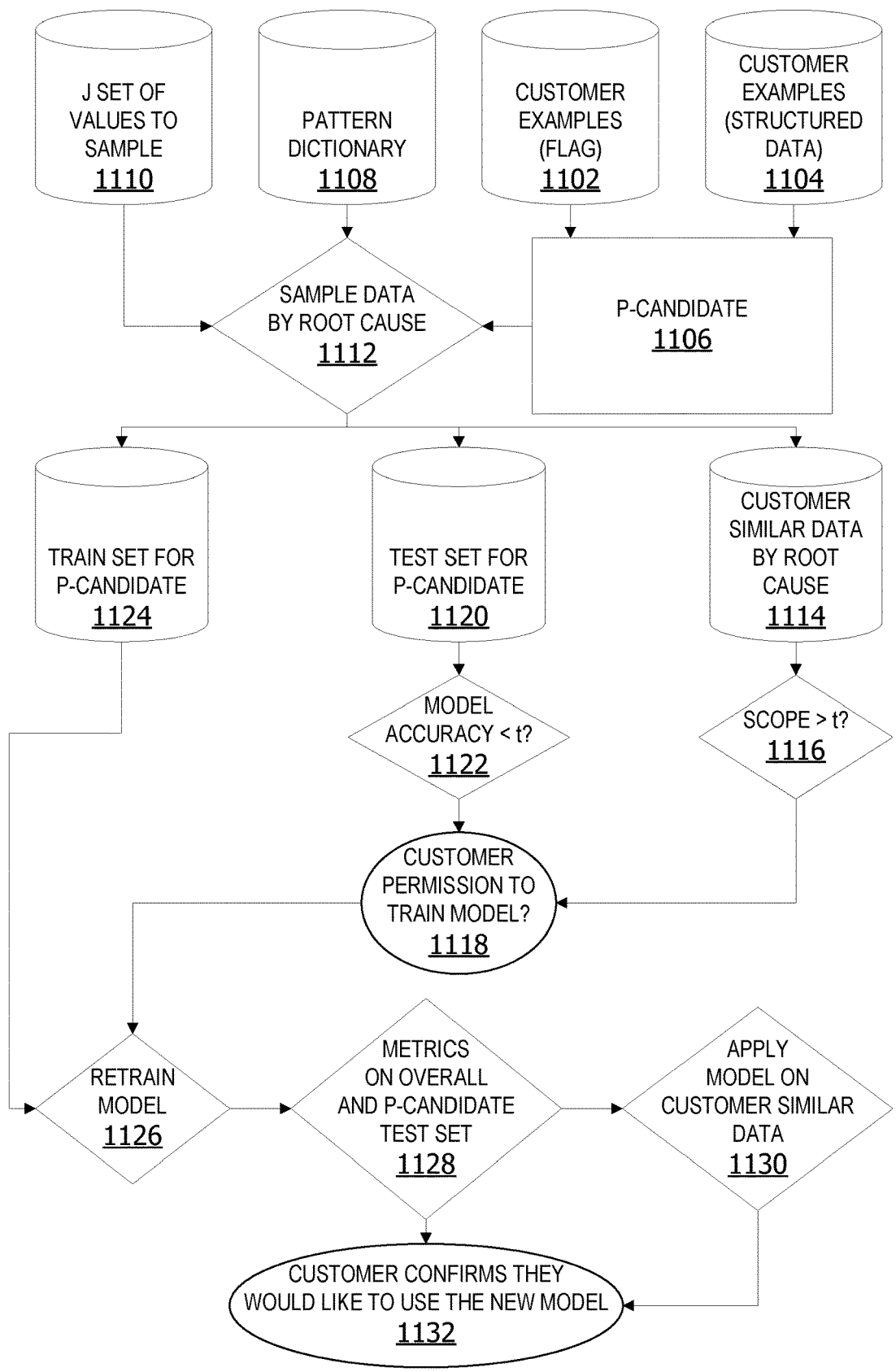
FIG. 11 is an exemplary flow chart illustrating operation of the computing device to automatically test and train machine learning models for normalizing data.

FIG. 11 is an exemplary flow chart illustrating operation of the computing device to automatically test and train machine learning models for normalizing data.

The system utilizes flagged customer examples 1102 of unstructured and/or structured customer examples 1104 obtained from data store, such as the data storage device 120 in FIG. 1 and/or the database 246 in FIG. 2. The customer examples 1102 and/or 1104 are searched to identify at least one candidate data portion or entry 1106. The system determines whether to create a sample set of data by root cause 1112 using a pattern dictionary 1108 and/or a "J" set of values to sample 1110. The sample data by root cause is a set of test data in which the unstructured data have the same root cause pattern as the candidate address 1106. If yes, the system analyzes customer data with similar addresses by root cause at 1114. The system determines if the scope of the root cause on the customer data is greater than a threshold at 1116. If yes, the system outputs a prompt to the user requesting customer permission to train the ML model at 1126. If the instances of the root cause in the customer data is low, it may be inefficient to retrain the model.

The system at 1120 generates sample data as a test set for analyzing the candidate address pattern using the ML model at 1120. A determination is made whether the accuracy of the data parsing results generated by the ML model is less than a threshold confidence level at 1122. If yes, customer permission to retrain the model is obtained at 1118. If permission is obtained to retrain the model, a training data set is generated for the candidate data at 1124. A determination is made whether to retrain the model at 1126.

If customer approval is obtained to train the model at 1126, a determination is made whether metrics on overall and candidate data test set at 1128. If yes, the model is applied on similar data obtained from the user at 1130. The similar data having the same root cause pattern as the candidate data. The retrained model goes into use for parsing data if the customer confirms they would like to use the new retrained model at 1132.

While the operations illustrated in FIG. 11 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 11.

In some examples, the system identifies patterns from the data by collecting examples with truth label from customer feedback or comparison with a structured address. The customer can flag a portion of data as incorrect and give truth label. The customer data may have a structured data example available. The system can compare the output of the model with this structured example data to find instances where the model did not parse the unstructured input data correctly.

The system identifies a pattern, p candidate, from the given examples. The system can also consider patterns that are not limited to the ordering of components but may also be related to the data characteristic. For example, data where the city "Sydney" is labeled incorrectly, or data with an additional space in the postcode value is labeled incorrectly.

In other examples, the system labels data, such as an address, according to some pattern (also used to create the pattern dictionary). The system finds similar addresses in the customer data by labeling them according to the addresses with the same pattern. This informs the user as to the number or magnitude of addresses with the pattern, to aid in the decision to generate a model or not, and also could be used to filter out addresses according to this pattern if the model does not perform well. In other words, the system outputs the number of addresses, percentage of addresses or other metric data indicating the how many addresses include the identified pattern. Addresses having the pattern are likely to be impacted by the root cause pattern during parsing if the model is not retrained to handle the root cause pattern differently.

In still other examples, the system generates data conforming to some pattern. For example, the system can sample from the pattern_dictionary k addresses according to pattern p candidate to be used as test data. If p_candidate does not exist in the dictionary, the system constructs address conforming to p_candidate by sampling and concatenating address components from the pattern_dictionary. For the data characteristic pattern, it generates data according to the data characteristic. For example, sampling and generating addresses with the city "Sydney" in them.

The system, in yet other examples evaluates data conforming to some pattern. The model manager evaluates the model on this sampled data and the similar addresses from their own data and shows the results to the user. The user can then decide if they would like to continue with the model training or not based on the results and the number of addresses with the similar pattern in their dataset.

In yet other examples, the system samples data conforming to some pattern. It can sample from the pattern_dictionary j addresses according to pattern p_candidate to be used as training data for j in some set of values J. Or using another method if the pattern is a data characteristic. The sampling algorithm is critical to the algorithm. The idea is to leverage the transition matrix to recommend the size of the sample.

The ML model, in some examples can be retrained for each training set generated. The ML model is evaluated on the data conforming to some pattern. For each retrained model, evaluate on the existing test data sets and the new test sets sampled from the pattern (step 3). Confirm the change has on parity metrics for other patterns and improves the p_candidate. For each retrained model, evaluate on the customer examples (given in the beginning at step 1). Also evaluate the model on identified similar addresses to the customer examples. If the metrics are on parity or improved, confirm if the customer wants to adopt the new model on the examples given by the customer or on addresses that would be parsed differently from the previous model in the rest of the customer data. The retrained model can then be deployed for utilization by the user.

FIG. 12 is an exemplary table 1200 including example address data set examples. The table 1200 include data set examples of root cause patterns such as, but not limited to, data characteristics and/or ordering of address components.

The different components, in some examples, are parsed from the unstructured address include:

address line 1, address line 2, address line 3, city, state, postal code, country, state district, and country region.

The pattern may be a textual representation of the components as in the example: address line 1 city state postal code country. The pattern in future work may also include some type of characteristic of the data: specific values or aliases or differences in formatting.

Many businesses have address data from their customers, but it is in an unstructured format. Parsing the addresses into a structured format improves unification of records, enrichment of data based on the parsed components, and segmentation of the data on the parsed components. The unification, enrichment, and segmentation improve the business's ability to have actionable insights on their data that can be used to increase profit for the business.

The system in some examples uses a pretrained model to parse the addresses. The ML model may be used on unseen customer data. There may also be other addresses the pretrained M model does not successfully parse into an accurate structural address data. To improve the accuracy of the ML model on user-provided data and improve the user's trust in the ML model, a customer feedback loop may be provided to improve the ML model. This feedback loop may be from customer examples or from the model manager's evaluation of the ML model processing customer data. These examples can be used to train a new custom model to improve the accuracy. The examples can also be used to identify similar addresses in case the model is not able to improve the segment and to be used for the model evaluation.

FIG. 13 is an exemplary table illustrating pattern dictionary data 1300. The pattern dictionary data 1300 includes an example of unstructured address data in input line 1302. The output 1304 illustrates the structured format of the example address in the pattern dictionary.

Thus, in some examples, a new process and technique for parsing an unstructured address into a structured form is provided. The system utilizes is a technique of labeling data as having some pattern. Data is generated into the pattern dictionary. Using stored data rather than user-provided customer data that has not yet been used for training or testing, a pattern dictionary is created based on the data. The key is the root cause pattern, and the value is the list of addresses with that value. For each address in the dataset, the address and pattern are added to the dictionary for the whole address and all sub patterns.

In an example scenario, a user provides the ML model with an unstructured address in which the data stored as a single column in a table. For example, the user may enter the following text:

Address: "1 Microsoft Way, Redmond, Wash., 98052, United States of America"

In this case, the output would be:
Address Line 1: 1 Microsoft Way
City: Redmond
State: WA
Postal code: 98052
Country: United States of America To perform the parsing of the address, in some examples, an ML model is used. The model is trained to improve model performance by extracting patterns and data characteristics of examples provided by users. The system can also provide sample customer addresses similar to the examples to help users understand the impact of the root cause pattern on the ML model performance processing a given user provided address data set.

A pattern is defined by the components and their order present in the parsed address, or some characteristics of the data in the pattern. In our example the pattern is:
address line 1 city state postal code country.
The user behavior is central to the process.

In the beginning, there are multiple ways the user can send us examples. If the customer data has a structured address, the system can compare the output of our model with the values from the structured address. Then the addresses that are not parsed correctly can be used as examples to improve the model. The user can report addresses that were not parsed correctly, and so the system can directly receive addresses in this way. Then the system can identify similar addresses in the data and create examples from the stored datasets. The model manager evaluates the current model on these results and shows them to the user. The user then knows the scale of the addresses suffering the problem and how bad the prediction overall on this segment.

Based on the information, the user can then choose if they would like us to train a custom model to improve these segments or not. If the metrics are already good, training a model may not be useful. Additionally, if there are few similar addresses it may not be worth training a new model, so it may be better to flag them and not use their output. At the end of the process, the user makes the choice to accept the new model that was improved based on the examples and addresses generated from our data based on the identified patterns after being shown the metrics on these datasets.

FIG. 14 is an exemplary table 1400 including metrics data for a trained ML model and the retrained ML model. The performance metrics data in the table 1400 illustrates the percentage accuracy for parsed data generated by the ML model at row 1402. The table 1400 shows an increase in accuracy of parsing data by the retrained ML model at row 1404. For example, the accuracy metrics for the ML model at 1402 shows an accuracy of sixty-nine-point six percent overall accuracy rate for parsed data output by the model in response to a data set. When the same data set is run through the retrained ML model, the accuracy rate increases up to eighty-four-point one percent. A significant improvement in data accuracy for the model output.

ADDITIONAL EXAMPLES

Some aspects and examples disclosed herein are directed to a system, method and/or computer executable instructions for normalizing address data by a ML model. The system includes a data storage device storing unstructured address data associated with a plurality of geographical addresses; a communications interface device that receives one or more geographical addresses incorrectly parsed by an address normalization model; at least one processor; and one or more tangible computer-readable media having stored thereon program code for normalizing address data, the program code causing the at least one processor to: identify a root cause including a pattern within unstructured address associated with the one or more geographical addresses potentially causing the address normalization model to incorrectly parse the one or more geographical addresses, wherein the pattern comprises an order of components within an address or a data characteristic of an address; generate a set of example address data comprising unstructured address data associated with a set of example geographical addresses, each example geographical address in the set of example geographical addresses comprising a pattern corresponding to the identified probable root cause; and re-train the address normalization model using the set of example address data to automatically generate a trained address normalization model capable of correctly parsing geographical addresses having the pattern associated with the root cause.

Additional aspects and examples disclosed herein are directed to a system, method or computer executable instructions for identifying one or more geographical addresses incorrectly parsed by an address normalization model; generating a root cause including a pattern within unstructured address data associated with the one or more geographical addresses causing the address normalization model to incorrectly parse the one or more geographical addresses, wherein the pattern comprises an order of components within an address or a data characteristic of an address; creating a set of example address data comprising unstructured address data including the pattern corresponding to the identified root cause; and re-training the address normalization model using the set of example address data, wherein the trained address normalization model is retrained to parse geographical addresses having the pattern associated with the root cause in a different manner to automatically reduce parsing errors.

Additional aspects and examples disclosed herein are directed to a system, method and/or one or more computer storage devices having computer-executable instructions stored thereon for automatically retraining models using root cause pattern recognition, which, on execution by a computer, cause the computer to perform operations comprising: receive an analysis result from a ML algorithm associated with a trained model, the analysis result comprising parsed data indicating the model is underperforming with regard to parsing at least a portion of the unstructured data input into the trained model; identify at least one pattern in the portion of the unstructured data associated with a root cause contributing to underperformance of the trained model, the pattern comprising at least one of an order of components within the portion of the unstructured data or a data characteristic of the unstructured data incorrectly parsed by the trained model; generate one or more examples comprising the root cause pattern; automatically retrain the ML algorithm associated with the trained model using the one or more examples wherein the retraining teaches the ML algorithm to correctly parse input unstructured data including the root cause pattern; and responsive to determining the retrained ML algorithm associated with the trained model is detecting the root cause pattern, resume parsing of the unstructured data by the trained model.

In some examples, a geographic address parsing/normalization model is retrained to identify examples of inaccurate address parsing by the machine learning model. The ML model identifies the pattern/root cause of inaccurate parsing examples and generates new training/testing data satisfying the identified patterns. The ML model finds customer examples similar to the identified patterns and evaluates the model for the new generated data. The system allows the user to decide whether to retrain the model or continue using the ML model without retraining it. The system generates or otherwise obtains sample training data for identified patterns and retrains the model. The ML model shares the metrics describing the ML model performance on the overall dataset and the new segment for the identified root cause.

In other examples, the system provides a new way to identify a root cause pattern that describes user example addresses (could be related to the order of the components in the address or a data characteristic). The ML model provides a new way to generate and sample new data according to the identified pattern. Customer addresses are segmented similar to the examples where the model predicted incorrect parsing results. The system further provides labeling existing data as having a given root cause pattern based on user-provided address data and/or based on preexisting address data available in a database or other data store. The labeled data is used to train and/or re-train the address normalization ML model. The model manager evaluates the address normalization ML models based on data that is segmented in accordance with the identified root cause pattern.

Alternatively, or in addition to the other examples described herein, examples include any combination of the following:

identify a potential root cause pattern associated with an incorrectly parsed portion of the unstructured data; generate a confidence score associated with the identified potential root cause pattern;

responsive to the confidence score falling below a threshold score, reject the identified cause as an actual root cause, wherein a low confidence score indicates a low level of confidence potential root cause pattern associated with the parsed portion of the data contributed to incorrect parsing of the portion of the unstructured data;

responsive to the confidence score being greater than or equal to the threshold score, identify the potential root cause pattern as the actual root cause for the incorrectly parsed portion, wherein a high confidence score indicates a high level of confidence the potential root cause pattern contributed to the incorrect parsing of the portion of the unstructured data;

present, via a user interface device, a result of an evaluation of the trained model using the set of test data with performance metrics to a user;

responsive to receiving user approval, authorize training of the ML algorithm associated with the trained model;

provide, via a user interface device, a result of an evaluation of the trained model to a user via a user interface device, wherein the trained model is evaluated using a set of test data with performance metrics;

responsive to receiving user approval, deploy the trained model, wherein the trained replaces an address normalization model for parsing geographical address data;

wherein the set of example geographical addresses comprises a set of test data for testing a performance of the address normalization model;

present, via a user interface device, a result of an evaluation of the address normalization model using the set of test data with performance metrics to a user;

responsive to receiving user approval, authorize re-training of the address normalization model;

provide, via a user interface device, a result of an evaluation of the trained address normalization model to a user via a user interface device, wherein the trained address normalization model is evaluated using a set of test data with performance metrics;

responsive to receiving user approval, deploy the trained address normalization model, wherein the trained address normalization model replaces the address normalization model for parsing geographical address data;

responsive to a determination the pattern is a market associated with an address in the one or more geographical addresses parsed incorrectly by the address normalization model, display a result of the address normalization model to a user interface device, the result comprising an identification of the potential root cause as a market pattern and a recommendation to continue utilization of the address normalization model without re-training;

a pattern dictionary, wherein the pattern is the order of the address components;

prompt, via a user interface device, a user to approve re-training of the address normalization model prior to beginning retraining, wherein retraining of the address normalization model occurs after receiving user approval;

prompt, via a user interface device, a user for approval to deploy the trained address normalization model, wherein the trained address normalization model is deployed for utilization in parsing geographical addresses after user approval is received;
identify a probable cause for an incorrectly parsed address;
generate a confidence score associated with the probable root cause;
responsive to the confidence score exceeding a threshold score, reject the probable cause as the root cause;
responsive to the confidence score falling below the threshold score, identify the probable cause as the root cause for the incorrectly parsed address;
generate an impact score associated with an impact of the root cause on a customer data set comprising a plurality of customer addresses for parsing by the address normalization model;
responsive to the impact score exceeding a threshold impact score, generate a recommendation to re-train the address normalization model wherein the recommend is presented to a user via a user interface device;
responsive to the impact score falling below the threshold impact score, generate a recommendation to continue using the trained ML model without retraining the ML model, wherein addresses having the pattern are flagged by the address normalization model;
providing, via a user interface device, a result of an evaluation of the address normalization model using the set of test data with performance metrics to a user;
authorizing re-training of the address normalization model in response to receiving user approval;
providing, via a user interface device, a result of an evaluation of the re-address normalization model to a user via a user interface device, wherein the trained address normalization model is evaluated using a set of test data with performance metrics;
authorizing deployment of the trained address normalization model, wherein the trained address normalization model replaces the address normalization model in response to receiving user approval;
generating an evaluation result of the address normalization model to a user interface device, the result comprising an identification of the root cause as a market pattern and a recommendation to continue utilization of the address normalization model without re-training in response to a determination the pattern is a market associated with an address in the one or more geographical addresses parsed incorrectly by the address normalization model;
present, via a user interface device, the evaluation result, including the recommendation, to a user;
identifying an example of inaccurate address parsing by the address normalization model based on a confidence score assigned to each parsed address generated by the address normalization model;
prompting, via a user interface device, a user to approve re-training of the address normalization model prior to beginning retraining, wherein retraining of the address normalization model occurs after receiving user approval;
retraining the address normalization model using a set of training data, including a plurality of labeled address data having the pattern associated with the identified root cause;
prompting, via a user interface device, a user for approval to deploy the trained address normalization model, wherein the re-trained machine learning model is deployed for utilization in parsing geographical addresses after user approval is received;
parsing a plurality of customer geographical addresses via deployed re-trained machine learning model;
generating an impact score associated with an impact of the root cause on a customer data set comprising a plurality of customer addresses for parsing by the address normalization model;
generating a recommendation to re-train the address normalization model in response to the impact score exceeding a threshold impact score wherein the recommend is presented to a user via a user interface device;
generating a recommendation to continue using the address normalization model without retraining in response to the impact score falling below the threshold impact score, wherein addresses having the pattern are flagged by the address normalization model;
identifying a cause for an incorrectly parsed portion of data; generating a confidence score associated with the cause; rejecting the probable cause as the root cause if a confidence score associated with the parsed portion of the data exceeds a threshold score, wherein a high confidence score indicates a high level of confidence the parsed portion of the data is parsed within expected performance parameters;
identifying the probable cause as the root cause for the incorrectly parsed address if the confidence score falls below the threshold score, wherein a low confidence score indicates a low level of confidence the parsed portion of the data is parsed within expected performance parameters;
wherein the one or more examples comprises a set of test data for testing a performance of the trained model;
a user interface device, wherein a model manager outputs a result of an evaluation of the trained model using the set of test data with performance metrics for presentation to a user via the user interface device;
generating the one or more examples based on at least a portion of data obtained from a pattern dictionary.

At least a portion of the functionality of the various elements in FIG. 1, FIG. 2, FIG. 3, FIG. 4, and FIG. 5 can be performed by other elements in FIG. 1, FIG. 2, FIG. 3, FIG. 4 and FIG. 5, or an entity (e.g., processor 106, web service, server, application program, computing device, etc.) not shown in FIG. 1, FIG. 2, FIG. 3, FIG. 4, and FIG. 5.

While the aspects of the disclosure have been described in terms of various examples with their associated operations, a person skilled in the art would appreciate that a combination of operations from any number of different examples is also within scope of the aspects of the disclosure.

Example Operating Environment

Figure 15:
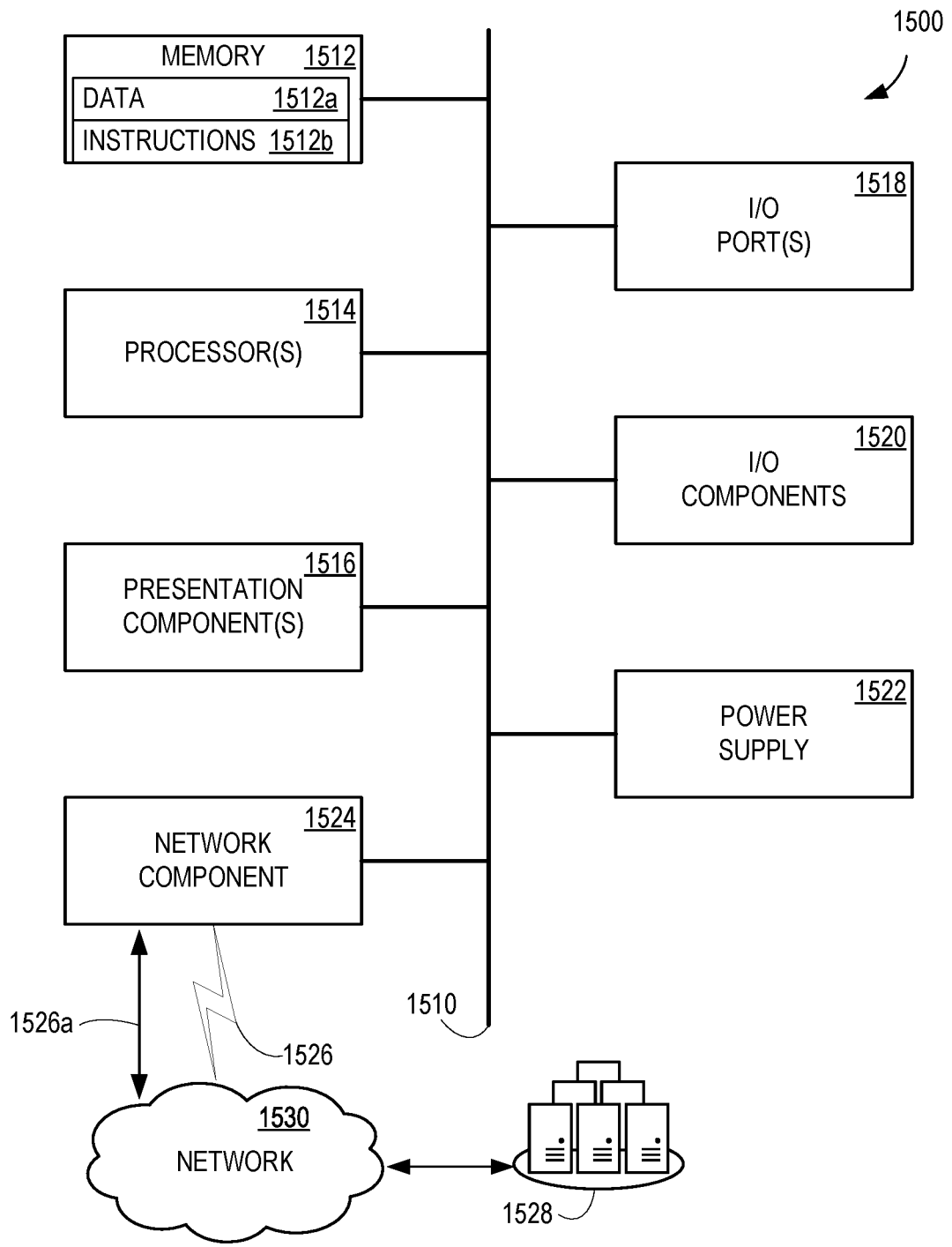
FIG. 15 is exemplary block diagram illustrating an example computing environment suitable for implementing some of the various examples disclosed herein.

FIG. 15 is a block diagram of an example computing device 1500 for implementing aspects disclosed herein and is designated generally as computing device 1500. Computing device 1500 is an example of a suitable computing environment and is not intended to suggest any limitation as to the scope of use or functionality of the examples disclosed herein. Neither should computing device 1500 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1500 includes a bus 1510 that directly or indirectly couples the following devices: computer-storage memory 1512, one or more processors 1514, one or more presentation components 1516, I/O ports 1518, I/O components 1520, a power supply 1522, and a network component 1524. While computing device 1500 is depicted as a seemingly single device, multiple computing devices 1500 may work together and share the depicted device resources. For example, memory 1512 may be distributed across multiple devices, and processor(s) 1514 may be housed with different devices.

Bus 1510 represents what may be one or more busses (such as an address bus, data bus, or a combination thereof). Although the various blocks of FIG. 15 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 15 and the references herein to a "computing device." Memory 1512 may take the form of the computer-storage media references below and operatively provide storage of computer-readable instructions, data structures, program modules and other data for computing device 1500. In some examples, memory 1512 stores one or more of an operating system, a universal application platform, or other program modules and program data. Memory 1512 is thus able to store and access data 1512a and instructions 1512b that are executable by processor 1514 and configured to carry out the various operations disclosed herein.

In some examples, memory 1512 includes computer-storage media in the form of volatile and/or nonvolatile memory, removable or non-removable memory, data disks in virtual environments, or a combination thereof. Memory 1512 may include any quantity of memory associated with or accessible by computing device 1500. Memory 1512 may be internal to computing device 1500 (as shown in FIG. 15), external to computing device 1500 (not shown), or both (not shown). Examples of memory 1512 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 1500. Additionally, or alternatively, memory 1512 may be distributed across multiple computing devices 1500, for example, in a virtualized environment in which instruction processing is carried out on multiple computing devices 1500. For the purposes of this disclosure, "computer storage media," "computer-storage memory," "memory," and "memory devices" are synonymous terms for computer-storage memory 1512, and none of these terms include carrier waves or propagating signaling.

Processor(s) 1514 may include any quantity of processing units that read data from various entities, such as memory 1512 or I/O components 1520 and may include CPUs and/or GPUs. Specifically, processor(s) 1514 are programmed to execute computer-executable instructions for implementing aspects of the disclosure. The instructions may be performed by the processor, by multiple processors within computing device 1500, or by a processor external to client computing device 1500. In some examples, processor(s) 1514 are programmed to execute instructions such as those illustrated in the in the accompanying drawings. Moreover, in some examples, processor(s) 1514 represent an implementation of analog techniques to perform the operations described herein. For example, the operations may be performed by an analog client computing device 1500 and/or a digital client computing device 1500. Presentation component(s) 1516 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1500, across a wired connection, or in other ways. I/O ports 1518 allow computing device 1500 to be logically coupled to other devices including I/O components 1520, some of which may be built in. Example I/O components 1520 include, for example but without limitation, a microphone, joystick, game pad, satellite dish, scanner, printer, wireless device, etc.

Computing device 1500 may operate in a networked environment via network component 1524 using logical connections to one or more remote computers. In some examples, network component 1524 includes a network interface card and/or computer-executable instructions (e.g., a driver) for operating the network interface card. Communication between computing device 1500 and other devices may occur using any protocol or mechanism over any wired or wireless connection. In some examples, network component 1524 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1524 communicates over wireless communication link 1526 and/or a wired communication link 1526a to a cloud resource 1528 across network 1530. Various different examples of communication links 1526 and 1526a include a wireless connection, a wired connection, and/or a dedicated link, and in some examples, at least a portion is routed through the internet.

Although described in connection with an example computing device 1500, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer system for automatically retraining a model using root cause pattern recognition, the computer system comprising:
    a data storage device storing unstructured data associated with a plurality of geographical addresses;
    a processor; and
    a computer-readable media having stored thereon program code for pattern recognition, the program code causing the processor to:
    receive an analysis result from a machine learning (ML) algorithm associated with a trained address normalization model, the analysis result comprising a plurality of parsed portions of the unstructured data, the analysis result indicating the trained address normalization model is underperforming with regard to parsing at least a portion of the unstructured data that is input into the trained address normalization model;
    identify a root cause of a parsing error associated with an incorrectly parsed portion contributing to underperformance of the trained address normalization model, wherein the incorrectly parsed portion is associated with at least one geographical address from the plurality of geographical addresses, wherein the at least one geographical address is parsed incorrectly by the ML algorithm associated with the trained address normalization model, and wherein the root cause includes a root cause pattern, the root cause pattern comprising an incorrect ordering of address components within the incorrectly parsed portion;
    generate a set of example address data comprising unstructured address data associated with a set of example geographical addresses by sampling from a pattern dictionary, wherein the set of example geographical addresses include a pattern conforming to the root cause pattern comprising the incorrect ordering of address components, wherein the set of example address data is generated based on at least a portion of the plurality of geographical addresses associated with the root cause pattern, and wherein the pattern dictionary comprises patterns associated with the incorrect ordering of address components;
    automatically retrain the ML algorithm associated with the trained address normalization model using the set of example address data, wherein the retraining teaches the ML algorithm to correctly parse the unstructured data including the root cause pattern; and responsive to determining the retrained ML algorithm associated with the trained address normalization model is detecting the root cause pattern, redeploy the trained address normalization model for parsing of the unstructured data including the root cause pattern.

2. The computer system of claim 1, wherein the set of example address data comprises a set of test data for testing a performance of the trained address normalization model, and further comprising:
a user interface device, wherein a model manager outputs a result of an evaluation of the trained address normalization model using the set of test data with performance metrics for presentation to a user via the user interface device.

3. The computer system of claim 1, wherein the program code further causes the processor to:
generate a confidence score for each parsed portion in the plurality of parsed portions, the confidence score indicating a level of confidence associated with parsing by the trained address normalization model; responsive to the confidence score falling below a confidence threshold score, flag the parsed portion as the incorrectly parsed portion by adding a flag to the incorrectly parsed portion.

4. The computer system of claim 1, wherein the program code further causes the processor to:
identify a potential root cause pattern associated with the incorrectly parsed portion of the unstructured data;
generate a root cause confidence score associated with the potential root cause pattern;
responsive to the root cause confidence score falling below a root cause threshold score, reject the potential root cause pattern as the root cause, wherein a low root cause confidence score indicates a low level of confidence that the potential root cause pattern associated with the incorrectly parsed portion of the data contributed to incorrect parsing of the portion of the unstructured data; and
responsive to the root cause confidence score being greater than or equal to the root cause threshold score, identify the potential root cause pattern as the root cause for the incorrectly parsed portion, wherein a high root cause confidence score indicates a high level of confidence the potential root cause pattern contributed to the incorrect parsing of the portion of the unstructured data.

5. The computer system of claim 1, wherein the program code further causes the processor to:
generate an impact score associated with the root cause and a selected data set comprising the unstructured data for parsing by the trained address normalization model, the impact score identifying a scope of the root cause present in the selected data set; and
generate a recommendation to train the ML algorithm associated with the trained address normalization model in response to the impact score exceeding a threshold impact score.

6. The computer system of claim 1, wherein the program code further causes the processor to:
generate test data using the pattern dictionary according to the identified root cause Pattern;
evaluate the trained address normalization model with the test data; and
based on the evaluation, determine whether to retrain the trained address normalization model.

7. The computer system of claim 1, wherein the program code further causes the processor to:
identify the root cause pattern is as a market associated with at least one geographical address from a plurality of geographical addresses parsed incorrectly by the trained address normalization model.

8. A method for automatically retraining a model using root cause pattern recognition, the method comprising:
receiving an analysis result from a ML algorithm associated with a trained address normalization model, the analysis result comprising a plurality of parsed portions of the unstructured data associated with a plurality of geographical addresses, the analysis result indicating the trained address normalization model is underperforming with regard to parsing at least a portion of the unstructured data that is input into the trained address normalization model;
identifying a root cause of a parsing error associated with an incorrectly parsed portion contributing to underperformance of the trained address normalization model, wherein the incorrectly parsed portion is associated with at least one geographical address from the plurality of geographical addresses, wherein the at least one geographical address is parsed incorrectly by the ML algorithm associated with the trained address normalization model, and wherein the root cause includes a root cause pattern, the root cause pattern comprising an incorrect ordering of address components within the incorrectly parsed portion;
generating a set of example address data comprising unstructured address data associated with a set of example geographical addresses by sampling from a pattern dictionary, wherein the set of example geographical address include a pattern conforming to the root cause pattern comprising the incorrect ordering of address components, wherein the set of example address data is generated based on at least a portion of the plurality of geographical addresses associated with the root cause pattern, and wherein the pattern dictionary comprises patterns associated with the incorrect ordering of address components;
automatically retraining the ML algorithm associated with the trained address normalization model using the set of example address data, wherein the retraining teaches the ML algorithm to correctly parse the unstructured data including the identified root cause pattern; and
responsive to determining the retrained ML algorithm associated with the trained address normalization model is detecting the root cause pattern, resuming parsing of the unstructured data by the trained address normalization model.

9. The method of claim 8, wherein the set of example address data comprises a set of test data for testing a performance of the trained address normalization model, and further comprising:
presenting, via a user interface device, a result of an evaluation of the trained address normalization model using the set of test data with performance metrics for presentation to a user via the user interface device.

10. The method of claim 8, further comprising:
generating a confidence score for each parsed portion in the plurality of parsed portions, the confidence score indicating a level of confidence associated with parsing by the trained address normalization model;
responsive to the confidence score falling below a confidence threshold score, flagging the parsed portion as the incorrectly parsed portion by adding a flag to the incorrectly parsed portion.

11. The method of claim 8, wherein identifying the root cause pattern further comprises:
- identifying a potential root cause pattern associated with the incorrectly parsed portion of the unstructured data;
- generating a root cause confidence score associated with the potential root cause pattern;
- responsive to the root cause confidence score falling below a root cause threshold score, rejecting the potential root cause pattern as the root cause, wherein a low root cause confidence score indicates a low level of confidence that the potential root cause pattern associated with the incorrectly parsed portion of the data contributed to incorrect parsing of the portion of the unstructured data; and
- responsive to the root cause confidence score being greater than or equal to the root cause threshold score, identifying the potential root cause pattern as the root cause for the incorrectly parsed portion, wherein a high root cause confidence score indicates a high level of confidence the potential root cause pattern contributed to incorrect parsing of the portion of the unstructured data.

12. The method of claim 8, further comprising:
- generating an impact score associated with an impact of the root cause on a customer data set comprising the unstructured data for parsing by the trained address normalization model; and
- generating a recommendation to retrain the ML algorithm associated with the trained address normalization model in response to the impact score exceeding a threshold impact score.

13. The method of claim 8, further comprising:
- generating test data using the pattern dictionary according to the identified root cause pattern;
- evaluating the trained address normalization model with the test data; and
- based on the evaluation, determining whether to retrain the trained address normalization model.

14. The method of claim 8, further comprising:
- identifying the root cause pattern as a market associated with at least one geographical address from the plurality of geographical addresses parsed incorrectly by the trained address normalization model.

15. One or more computer storage devices having computer-executable instructions stored thereon for automatically retraining a model using root cause pattern recognition, which, on execution by a computer, cause the computer to perform operations comprising:
- receiving an analysis result from a ML algorithm associated with a trained address normalization model, the analysis result comprising a plurality of parsed portions of the unstructured data associated with a plurality of geographical addresses, the analysis result indicating the trained address normalization model is underperforming with regard to parsing at least a portion of the unstructured data that is input into the trained address normalization model;
- identifying a root cause of a parsing error associated with an incorrectly parsed portion contributing to underperformance of the trained address normalization model, wherein the incorrectly parsed portion is associated with at least one geographical address from the plurality of geographical addresses, wherein the at least one geographical address is parsed incorrectly by the ML algorithm associated with the trained address normalization model, and wherein the root cause includes a root cause pattern, the root cause pattern comprising an incorrect ordering of address components within the incorrectly parsed portion;
- generating a set of example address data comprising unstructured data associated with a set of example geographical addresses by sampling from a pattern dictionary, wherein the set of example geographical addresses include a pattern conforming to the root cause pattern comprising the incorrect ordering of address components, wherein the set of example address data is generated based on at least a portion of the plurality of geographical addresses associated with the root cause pattern, and wherein the pattern dictionary comprises patterns associated with the incorrect ordering of address components;
- automatically retraining the ML algorithm associated with the trained address normalization model using the set of example address data, wherein the retraining teaches the ML algorithm to correctly parse the unstructured data including the root cause pattern; and
- responsive to determining the retrained ML algorithm associated with the trained address normalization model is detecting the root cause pattern, resuming parsing of the unstructured data by the trained address normalization model.

16. The one or more computer storage devices of claim 15, wherein the operations further comprise:
- presenting, via a user interface device, a result of an evaluation of the trained address normalization model using a set of test data with performance metrics for presentation to a user via a user interface device.

17. The one or more computer storage devices of claim 15, wherein the operations further comprise:
- generating a confidence score for each parsed portion in the plurality of parsed portions, the confidence score indicating a level of confidence associated with parsing by the trained address normalization model; and
- responsive to the confidence score falling below a confidence threshold score, flagging the parsed portion as the incorrectly parsed portion by adding a flag to the incorrectly parsed portion.

18. The one or more computer storage devices of claim 15, wherein the operations further comprise:
- identifying a potential root cause pattern associated with the incorrectly parsed portion of the unstructured data;
- generating a root cause confidence score associated with the potential root cause pattern;
- rejecting the potential root cause pattern as the root cause in response to the root cause confidence score falling below a root cause threshold score, wherein a low root cause confidence score indicates a low level of confidence the potential root cause pattern associated with the incorrectly parsed portion of the data contributed to incorrect parsing of the portion of the unstructured data; and
- identifying the potential root cause pattern as the root cause for the incorrectly parsed portion in response to the root cause confidence score being greater than or equal to the root cause threshold score, wherein a high confidence score indicates a high level of confidence the potential root cause pattern contributed to the incorrect parsing of the portion of the unstructured data.

19. The one or more computer storage devices of claim 15, wherein the operations further comprise:

generating an impact score associated with an impact of the root cause on a customer data set comprising the unstructured data for parsing by the trained address normalization model; and generating a recommendation to retrain the ML algorithm associated with the trained address normalization model in response to the impact score exceeding a threshold impact score.

20. The one or more computer storage devices of claim 15, wherein the operations further comprise:

generating test data using the pattern dictionary according to the identified root cause pattern;

evaluating the trained address normalization model with the test data; and based on the evaluation, determining whether to retrain the trained address normalization model.

* * * * *